US009398515B2

(12) United States Patent
Wilkinson et al.

(10) Patent No.: US 9,398,515 B2
(45) Date of Patent: *Jul. 19, 2016

(54) VPNV4 ROUTE CONTROL FOR LTE X2 SON USING IMPORT ROUTE MAPS AND OUTBOUND ROUTE FILTERING

(71) Applicant: Telefonaktiebolaget L M Ericsson (publ), Stockholm (SE)

(72) Inventors: Andrew Wilkinson, San Jose, CA (US); Nayil Kavak, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 237 days.

This patent is subject to a terminal disclaimer.

(21) Appl. No.: 14/056,814

(22) Filed: Oct. 17, 2013

(65) Prior Publication Data
US 2015/0110002 A1 Apr. 23, 2015

(51) Int. Cl.
*H04W 4/00* (2009.01)
*H04W 40/06* (2009.01)
(Continued)

(52) U.S. Cl.
CPC .............. *H04W 40/06* (2013.01); *H04L 45/04* (2013.01); *H04W 40/02* (2013.01); *H04L 45/54* (2013.01); *H04L 2212/00* (2013.01); *H04W 40/246* (2013.01)

(58) Field of Classification Search
CPC ... H04W 40/06; H04W 40/02; H04W 40/246; H04L 45/04; H04L 45/54; H04L 2212/00
USPC .................................................. 370/328, 329
See application file for complete search history.

(56) References Cited

U.S. PATENT DOCUMENTS 8,787,319 B2    7/2014  Hapsari et al.
2006/0084470 A1 4/2006  Hashimoto et al.
(Continued)

FOREIGN PATENT DOCUMENTS

EP      2244495        10/2010
WO   WO-2012/093893     7/2012
(Continued)

OTHER PUBLICATIONS

WIPO Publication WO/2012/093893, Published on Jul. 12, 2012, to Jung.*
(Continued)

*Primary Examiner* — Peter Cheng
(74) *Attorney, Agent, or Firm* — Nicholson De Vos Webster & Elliott, LLP

(57) ABSTRACT

In an embodiment, a network device automatically creates a more optimal route entry for inter-base station traffic to be transmitted between a local base station and a remote base station. The network device automatically discovers a remote IP address of the remote base station used for inter-base station traffic based upon traffic transmitted by the local base station destined to the network device or traffic transmitted between the local and remote base stations. In response, the network device inserts an entry into a route import map representing the remote IP address, and based upon determining that a route from a route update message matches this entry, installs the more optimal route entry into the routing table. This route provides a shorter path to the remote base station through the backhaul network compared to a less optimal route through a mobile core network previously used for the inter-base station traffic.

18 Claims, 12 Drawing Sheets

(51) Int. Cl.
*H04W 40/02* (2009.01)
*H04L 12/715* (2013.01)
*H04L 12/741* (2013.01)
*H04W 40/24* (2009.01)

(56) References Cited

U.S. PATENT DOCUMENTS

| | | | |
|---|---|---|---|
| 2006/0215582 | A1 | 9/2006 | Castagnoli |
| 2007/0248103 | A1 | 10/2007 | Delaney et al. |
| 2009/0042597 | A1 | 2/2009 | Yuuki |
| 2009/0109933 | A1 | 4/2009 | Murasawa et al. |
| 2011/0075633 | A1 | 3/2011 | Johansson et al. |
| 2011/0086655 | A1 | 4/2011 | Hwang et al. |
| 2011/0161394 | A1 | 6/2011 | Chidel et al. |
| 2011/0243024 | A1 | 10/2011 | Osterling |
| 2011/0310791 | A1* | 12/2011 | Prakash ............... H04W 24/02 370/315 |
| 2012/0314689 | A1 | 12/2012 | Wang |
| 2013/0051316 | A1* | 2/2013 | Bhatt ................... H04W 92/20 370/328 |
| 2013/0281097 | A1* | 10/2013 | Jung ................. H04W 36/0072 455/444 |
| 2014/0016628 | A1 | 1/2014 | McCann et al. |
| 2015/0110062 | A1 | 4/2015 | Nishio |

FOREIGN PATENT DOCUMENTS

| WO | WO-2012/148217 | | 11/2012 |
|---|---|---|---|
| WO | WO-2013/137815 | A2 | 9/2013 |

OTHER PUBLICATIONS

U.S. Appl. No. 14/056,825, Notice of Allowance, mailed Oct. 9, 2015, 16 pages.
"3GPP TS 33.210 V5.0.0", *3rd Generation Partnership Project; Technical Specification Group Services and System Aspects; 3G Security; Network Domain Security; IP network layer security (Release 5)*; http://www.3gpp.org/ftp/tsg_sa/WG3_Security/_Specs/, (Mar. 2002), 19 pages.
"3GPP TS 36.300 V8.3.0", *3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)*, (http://www.quintillion.co.jp/3GPP/Specs/36300-830.pdf), (Dec. 2007), 120 pages.
"3GPP TS 36.410 V8.0.0", *3rd Generation Partnership Project; Technical Specification Group Radio Access Network; Evolved Universal Terrestrial Access Network (E-UTRAN); S1 General aspects and principles (Release 8)*; http://www.quintillion.co.jp/3GPP/Specs/36410-800.pdf, (Dec. 2007), 13 pages.
"3GPP TS 36.412 V10.1.0", *3rd Generation Partnership Project; Technical Specification Group Radio Access Network; Evolved Universal Terrestrial Radio Access Network (E-UTRAN); S1 signalling transport (Release 10)*; http://www.quintillion.co.jp/3GPP/Specs/36412-a10.pdf, (Jun. 2011), 8 pages.
"3GPP TS 36.413 V9.3.0", *3rd Generation Partnership Project; Technical Specification Group Radio Access Network; Evolved Universal Terrestrial Radio Access Network (E-UTRAN); S1 Application Protocol (S1AP) (Release 9)*; http://www.quintillion.co.jp/3GPP/Specs/36413-930.pdf, (Jun. 2010), 241 pages.
"3GPP TS 36.420 V9.0.1", *3rd Generation Partnership Project; Technical Specification Group Radio Access Network; Evolved Universal Terrestrial Radio Access Network (E-UTRAN); X2 general aspects and principles (Release 9)*; http://www.quintillion.co.jp/3GPP/Specs/36420-901.pdf, (Mar. 2011), 12 pages.
"3GPP TS 36.422 V8.5.0", *3rd Generation Partnership Project; Technical Specification Group Radio Access Network; Evolved Universal Terrestrial Access Network (E-UTRAN); X2 signaling transport (Release 8)*; http://www.quintillion.co.jp/3GPP/Specs/36422-850.pdf, (Mar. 2009), 8 pages.
"3GPP TS 36.423 V9.2.0", *3rd Generation Partnership Project; Technical Specification Group Radio Access Network; Evolved Universal Terrestrial Radio Access Network (E-UTRAN); X2 application protocol (X2AP) (Release 9)*; http://www.quintillion.co.jp/3GPP/Specs/36423-920.pdf, (Mar. 2010), 120 pages.
"3GPP TS 36.424 V9.0.1", *3rd Generation Partnership Project; Technical Specification Group Radio Access Network; Evolved Universal Terrestrial Radio Access Network (E-UTRAN); X2 data transport (Release 9)*; http://www.quintillion.co.jp/3GPP/Specs/36424-901.pdf, (Mar. 2011), 8 pages.
"UMMT 3.0 Design Guide Technical Paper", *Cisco Systems, Inc., SDU-6432, Version 1.0*, https://communities.cisco.com/servlet/JiveServlet/downloadBody/30621-102-1-54762/UMMT_3.0_Design_Guide_Technical_Paper.pdf, (Jul. 12, 2012), 104 pages.
RFC 768: Postel, J., "User Datagram Protocol", *RFC 768*, (Aug. 28, 1980), 3 pages.
RFC 793: Postel, J., "Transmission Control Protocol", *STD 7, RFC 793, Internet Standard*, Information Sciences Institute, USC, (Sep. 1981), 91 pages.
RFC 1058: Hedrick, C., "Routing Information Protocol", *Network Working Group, Request for Comments: 1058*, (Jun. 1988), 33 pages.
RFC 1142: Oran, David, "OSI ISIS Intradomain Routing Protocol", *Network Working Group, Request for Comments: 1142*, (Feb. 1990), 157 pages.
RFC 1180: Socolofsky, T., et al., "A TCP/IP Tutorial", *Network Working Group, Request for Comments: 1180*, (Jan. 1991), 28 pages.
RFC 2080: Malkin, et al., "RIPng for IPv6", *Network Working Group, Request for Comments: 2080*, (Jan. 1997), 19 pages.
RFC 2205: Braden, et al., "Resource ReSerVation Protocol (RSVP)—Version 1 Functional Specification", *Network Working Group, Request for Comments: 2205*, (Sep. 1997), 112 pages.
RFC 2210: Wroclawski, J., "The Use of RSVP with IETF Integrated Services", *Network Working Group, Request for Comments: 2210*, (Sep. 1997), 33 pages.
RFC 2211: Wroclawski, J., "Specification of the Controlled-Load Network Element Service", *Network Working Group, Request for Comments: 2211*, (Sep. 1997), 19 pages.
RFC 2212: Shenker, et al., "Specification of Guaranteed Quality of Service", *Network Working Group, Request for Comments: 2212*, (Sep. 1997), 20 pages.
RFC 2328: Moy, J., "OSPF Version 2", *Network Working Group, Request for Comments: 2328, The Internet Society*, (Apr. 1998), 244 pages.
RFC 2453: Malkin, G., "RIP Version 2", *Network Working Group, Request for Comments: 2453, The Internet Society*, (Nov. 1998), 39 pages.
RFC 2460: Deering, et al., "Internet Protocol, Version 6 (IPv6) Specification", *Network Working Group, Request for Comments: 2460, The Internet Society*, (Dec. 1998), 39 pages.
RFC 2474: Nichols, K., et al., "Definition of the Differentiated Services Field (DS Field) in the IPv4 and IPv6 Headers", *Network Working Group, Request for Comments: 2474, The Internet Society*, (Dec. 1998), 20 pages.
RFC 2475: Blake, S., et al. "An Architecture for Differentiated Services", *Network Working Group, Request for Comments: 2475, The Internet Society*, (Dec. 1998), 36 pages.
RFC 2597: Heinanen, J., et al., "Assured Forwarding PHB Group", *The Internet Society, RFC 2597*, (Jun. 1999), 11 pages.
RFC 2675: Borman, D., et al., "IPv6 Jumbograms", *Network Working Group, Request for Comments: 2675, The Internet Society*, (Aug. 1999), 9 pages.
RFC 2983: Black, D., "Differentiated Services and Tunnels", *Network Working Group, Request for Comments: 2983, The Internet Society*, (Oct. 2000), 14 pages.
RFC 3086: Nichols, K., et al., "Definition of Differentiated Services Per Domain Behaviors and Rules for their Specification", *Network Working Group, Request for Comments: 3086, The Internet Society*, (Apr. 2001), 24 pages.
RFC 3140: Black, D., et al., "Per Hop Behavior Identification Codes", *Network Working Group, Request for Comments: 3140, The Internet Society*, (Jun. 2001), 8 pages.

(56) References Cited

OTHER PUBLICATIONS

RFC 3209: Awduche, D., et al., "RSVP-TE: Extensions to RSVP for LSP Tunnels", *Network Working Group, Request for Comments: 3209, The Internet Society*, http://tools.ietf.org/html/rfc3209, (Dec. 2001), 61 pages.
RFC 3246: Davie, B., et al., "An Expedited Forwarding PHB (Per-Hop Behavior)", *Network Working Group, Request for Comments: 3246, The Internet Society*, (Mar. 2002), 16 pages.
RFC 3247: Charny, A., et al., "Supplemental Information for the New Definition of the EF PHB (Expedited Forwarding Per-Hop Behavior)", *Network Working Group, Request for Comments: 3247, The Internet Society*, (Mar. 2002), 24 pages.
RFC 3260: Grossman, D., "New Terminology and Clarifications for Diffserv", *Network Working Group, Request for Comments: 3260, The Internet Society*, (Apr. 2002), 10 pages.
RFC 3289: Baker, F., et al., "Management Information Base for the Differentiated Services Architecture", *Network Working Group, Request for Comments: 3289, The Internet Society*, (May 2002), 116 pages.
RFC 3290: Bernet, Y., et al., "An Informal Management Model for Diffserv Routers", *Network Working Group, Request for Comments: 3290, The Internet Society*, (May 2002), 56 pages.
RFC 3317: Chan, K., et al., "Differentiated Services Quality of Service Policy Information Base", *Network Working Group, Request for Comments: 3317, The Internet Society*, (Mar. 2003), 96 pages.
RFC 3473: Berger, L., "Generalized Multi-Protocol Label Switching (GMPLS) Signaling Resource ReserVation Protocol-Traffic Engineering (RSVP-TE) Extensions", *Network Working Group, Request for Comments: 3473*, http://tools.ietf.org/html/rfc3473, (Jan. 2003), 42 pages.
RFC 3936: Kompella, et al., "Procedures for Modifying the Resource reSerVation Protocol (RSVP)", *Network Working Group, Request for Comments: 3936, The Internet Society*, (Oct. 2004), 7 pages.
RFC 4113: Fenner, B., et al., "Management Information Base for the User Datagram Protocol (UDP)", *Network Working Group, Request for Comments: 4113, The Internet Society*, (Jun. 2005), 19 pages.
RFC 4271: Rekhter, Y., et al., "A Border Gateway Protocol 4 (BGP-4)", *Network Working Group, Request for Comments: 4271, The Internet Society*, (Jan. 2006), 104 pages.
RFC 4301: Kent, et al., "Security Architecture for the Internet Protocol", *Network Working Group, Request for Comments: 4301, The Internet Society*, (Dec. 2005), 101 pages.
RFC 4309: Housley, "Using Advanced Encryption Standard (AES) CCM Mode with IPsec Encapsulating Security Payload (ESP)", *Network Working Group, Request for Comments: 4309, The Internet Society*, (Dec. 2005), 13 pages.
RFC 4495: Polk, et al., "A Resource Reservation Protocol (RSVP) Extension for the Reduction of Bandwidth of a Reservation Flow", *Network Working Group, Request for Comments: 4495, The Internet Society*, (May 2006), 21 pages.
RFC 4558: Ali, et al., "Node-ID Based Resource Reservation Protocol (RSVP) Hello: A Clarification Statement", *Network Working Group, Network Working Group, Request for Comments: 4558, The Internet Society*, (Jun. 2006), 7 pages.
RFC 4594: Babiarz, J., et al., "Configuration Guidelines for DiffServ Service Classes", *Network Working Group, Request for Comments: 4594, The Internet Society*, (Aug. 2006), 57 pages.

RFC 4960: Stewart, R., "Stream Control Transmission Protocol", *Network Working Group, Request for Comments (RFC): 4960*; http://tools.ietf.org/html/rfc4960, (Sep. 2007), 152 pages.
RFC 5036: Andersson, L., et al., "LDP Specification", *Network Working Group, Request for Comments: 5036*, (Oct. 2007), 135 pages.
RFC 5340: Coltun, et al., "OSPF for IPv6", *Network Working Group Request for Comments: 5340, IETF*, https://tools.ietf.org/html/rfc5340, (Jul. 2008), 95 pages.
RFC 5405: Eggert, L., et al., "Unicast UDP Usage Guidelines for Application Designers", *Network Working Group, Request for Comments: 5405, IETF Trust*, (Nov. 2008), 27 pages.
RFC 5865: Baker, F., "A Differentiated Services Code Point (DSCP) for Capacity-Admitted Traffic", *Internet Engineering Task Force (IETF), Request for Comments: 5865, IETF Trust*, (May 2010), 14 pages.
Khan, et al., "The benefits of self-organizing backhaul networks", *Ericsson Review*, http://www1.ericsson.com/res/thecompany/docs/publications/ericsson_review/2013/er-son-transport.pdf, (Sep. 27, 2013), 9 pages.
Salmelin, et al., "Security in 3GPP Mobile Networks 303", Chapter 9.1 of "*Mobile Backhaul*," *John Wiley and Sons, Ltd.*, (May 2012), 3 pages.
U.S. Appl. No. 14/056,770, Non-Final Office Action, mailed May 13, 2015, 18 pages.
International Application No. PCT/IB2014/065183, PCT Notification of Transmittal of the International Search Report and the Written Opinion of the International Searching Authority, mailed Jan. 22, 2015, 14 pages.
U.S. Appl. No. 14/056,760, Non-Final Office Action, mailed May 6, 2015, 16 pages.
International Application No. PCT/IB2014/065184, PCT International Search Report and the Written Opinion of the International Searching Authority, mailed Jan. 22, 2015, 11 pages.
U.S. Appl. No. 14/056,809, Non-Final Office Action, mailed May 7, 2015, 22 pages.
International Application No. PCT/IB2014/065185, PCT Notification of Transmittal of the International Search Report and the Written Opinion of the International Searching Authority, mailed Feb. 25, 2015, 11 pages.
"3GPP TS 36.422 V11.0.0", 3rd Generation Partnership Project; Technical Specification Group Radio Access Network; Evolved Universal Terrestrial Access Network (E-UTRAN); X2 signaling transport (Release 11); Oct. 2012, 8 pages.
"3GPP TS 36.423 V11.0.0", 3rd Generation Partnership Project; Technical NP LOB Specification Group Radio Access Network; Evolved Universal Terrestrial Radio Access Network (E-UTRAN); X2 application protocol (X2AP) (Release 11); Mar. 2012, 120 pages.
International Application No. PCT/IB2014/065183, PCT Written Opinion of the International Preliminary Examining Authority, mailed Sep. 9, 2015, 11 pages.
International Application No. PCT/IB2014/065184, PCT Written Opinion of the International Preliminary Examining Authority, mailed Sep. 9, 2015, 9 pages.
U.S. Appl. No. 14/056,770, Final Office Action, mailed Oct. 29, 2015, 14 pages.
U.S. Appl. No. 14/056,760, Notice of Allowance, mailed Nov. 4, 2015, 8 pages.
U.S. Appl. No. 14/056,809, Notice of Allowance, mailed Nov. 12, 2015, 9 pages.

* cited by examiner

VPNV4 ROUTE CONTROL FOR LTE X2 SON USING IMPORT ROUTE MAPS AND OUTBOUND ROUTE FILTERING

FIELD

Embodiments of the invention relate to the field of networking; and more specifically, to network topology discovery and the automatic creation of network routes between base stations for inter-base station traffic.

BACKGROUND

The Third-Generation Partnership Project (3GPP) defines standards and technical specifications for a 3G mobile system referred to as Long Term Evolution (LTE). In contrast to the circuit-switched configurations utilized by previous cellular communication systems, LTE has been designed to support packet-switched services, thereby providing seamless Internet Protocol (IP) connectivity between user equipment (UE) devices and one or more packet data networks (PDNs) without disruption during the geographic movement of end users.

While the term "LTE" includes the evolution of the Universal Mobile Telecommunications System (UMTS) radio access through the Evolved UTRAN (E-UTRAN), it is also accompanied by an evolution of the non-radio aspects under the term "System Architecture Evolution" (SAE), which includes the Evolved Packet Core (EPC) network. Together LTE and SAE form the Evolved Packet System (EPS).

In most LTE networks, the E-UTRAN access network is made up of Evolved NodeB (eNodeB, or eNB) radio base stations that directly communicate with UE devices. One or more eNodeBs may be located in a grouping and coupled to the EPC mobile core (through a mobile backhaul network) via a cell site router (CSR). The mobile backhaul network may utilize one or more of IP, Multiprotocol Label Switching (MPLS), Hierarchical MPLS (H-MPLS), or another protocol.

The EPC typically includes at least the following three logical nodes: a Mobility Management Entity (MME), a Serving Gateway (S-GW), and a Packet Data Network Gateway (PDN-GW). These nodes, and other logical nodes of the EPC, are well known to those of skill in the art.

As the UE devices utilizing LTE networks are often mobile, changes of geographic location by the UE devices occur. As a UE device moves away from one eNodeB and closer to another eNodeB, the LTE network manages a handover of the UE device from the first "source" eNodeB to the second "target" eNodeB to ensure seamless connectivity. Depending upon the scenario and the particular network configuration, the handover may also require a change of cell site, MME, and/or S-GW. In many LTE network configurations, handover communications are exchanged between the two eNodeBs through the EPC mobile core network and are switched centrally at a Local/Regional Switching Site. These handover communications are typically referred to as X2 traffic, which is named after the X2 virtual interface used by eNodeBs for such communications. In some typical configurations, each eNodeB is assigned one or more network addresses (e.g., IP addresses), and one such network address is be used by the eNodeB primarily for X2 communications. In some embodiments, however, an eNodeB has a first network address for X2 control plane (X2-C) traffic, and a second network address for X2 user plane (X2-U) traffic.

Instead of sending the X2 traffic back to the EPC to be sent to a remote eNodeB, it is also possible for network operators to manually configure static routes between eNodeBs in a mobile backhaul network for the X2 traffic, which may include placing a pair of X2 members in an MPLS Virtual Private Network (VPN). However, a given eNodeB may typically have approximately 20-30 neighboring eNodeBs at a time, each of which will require a configured route with each of its neighbors, which requires a large and error-prone configuration, and which further consumes a large amount of routing state to be maintained in the network. Additionally, as the number of eNodeBs in a network tends to fluctuate as networks are extended, reconfigured, and maintained, a huge administrative overhead is thus created for maintaining such static routes. Accordingly, because of the complexity of creation and maintenance, many network operators forego creating and maintaining inter-base station routes, and simply allow X2 traffic to flow back through the EPC mobile core to be switched.

Recently, the 3GPP has begun working on defining new applications that will be carried over the X2 interface. These new applications include Coordinated Multi-Point (CoMP), Enhanced InterCell Interference Cancellation (eICIC), and Location services, among others. These applications require much higher bandwidth and are also much less delay tolerant than current X2 traffic. Accordingly, there is a need for easily and efficiently routing X2 traffic between eNodeBs.

SUMMARY

Embodiments of the invention are useful in cell site routers (CSRs) to allow the CSRs to automatically discover local and/or remote X2 IP addresses in current use or that will be used for inter-base station traffic. With the knowledge of the X2 IP addresses, the CSR can automatically create network route for the X2 traffic and thereby eliminate a need to manually create specific routes at the CSRs, border routers, and route reflectors of the network for such traffic, which would otherwise be required to control the scaling of state in a LTE transport service, or alternatively eliminate the need to constantly route inter-base station traffic back into the mobile core for further routing. Thus, significant manual labor is eliminated and X2 traffic can be forwarded between base stations according to dynamically generated efficient routes, which in some embodiments could be shortest path routes. Additionally, the routes can be generated on-demand as needed, and automatically removed when the need no longer exists, which avoids the unnecessary configuration of a full or partial mesh of routes between adjacent base stations.

According to an embodiment of the invention, a method is performed in a network device communicatively coupled to a local base station at a cell site for automatic creation of a more optimal route entry in the network device for inter-base station traffic to be transmitted between the local base station and a remote base station through a backhaul network. The method includes automatically discovering a remote IP address of the remote base station based upon traffic transmitted by the local base station destined to the network device or based upon traffic transmitted between the local base station and the remote base station. The remote IP address is utilized for the inter-base station traffic. The method also includes, responsive to the discovering of the remote IP address of the remote base station, inserting an entry into an route import map representing the remote IP address. The route import map is utilized by the network device to identify routes distributed according to a routing protocol that are to be installed into a routing table of the network device. The method also includes receiving, at a network interface of the network device, a route update message following the routing protocol that includes a set of one or more routes of the network. One route of the set of routes comprises a prefix of the remote IP address. The one route is the more optimal route as it provides a shorter path to the remote base station through the backhaul network compared to a less optimal route through a mobile core network previously used for the inter-base station traffic. The method also includes installing a route entry into the routing table of the network device based upon determining that the one route matches the entry of the route import map.

According to an embodiment of the invention, a network device is to be communicatively coupled to a set of one or more local base stations at a cell site is configured to automatically create more optimal route entries for inter-base station traffic to be transmitted between the set of local base stations and a set of one or more remote base stations through a backhaul network. The network device includes a set of one or more network interfaces and an address discovery module coupled to the set of network interfaces. The address discovery module is configured to automatically discover, based upon traffic transmitted by the set of local base stations destined to the network device or based upon traffic transmitted between the set of local base stations and the set of remote base stations, remote IP addresses of the set of remote base stations that are used for the inter-base station traffic. The network device also includes an automatic routing module coupled to the set of network interfaces. The automatic routing module is configured to insert, responsive to the address discovery module discovering one of the remote IP addresses of the set of remote base stations, an entry into an route import map representing the one remote IP address. The route import map is to be utilized by the network device to identify routes distributed according to a routing protocol that are to be installed into a routing table of the network device. The automatic routing module is also configured to receive, using the set of network interfaces, route update messages following the routing protocol that include routes of the backhaul network. The automatic routing module is also configured to install route entries into the routing table of the network device based upon determining that routes of the received route update messages match entries of the route import map, where some of the route entries are more optimal routes providing shorter paths to the set of remote base stations through the backhaul network compared to less optimal routes through a mobile core network previously used for the inter-base station traffic.

According to an embodiment of the invention, a network device communicatively coupled to a local base station at a cell site performs a method for automatic creation of a more optimal route entry in the network device for inter-base station traffic to be transmitted between the local base station and a remote base station through a backhaul network. The method includes automatically discovering a remote IP address of the remote base station based upon traffic transmitted by the local base station destined to the network device or based upon traffic transmitted between the local base station and the remote base station. The remote IP address is utilized for the inter-base station traffic. The method also includes, responsive to the discovering of the remote IP address of the remote base station, transmitting an outbound route filtering (ORF) request to a second network device serving as a route reflector in the backhaul network to cause the second network device to filter which routes it transmits to the network device according to the ORF request. The ORF request indicates that the network device seeks route updates for routes encompassing the remote IP address. The method also includes receiving, at a network interface of the network device, a route update message transmitted by the second network device. The route update message follows a routing protocol and includes a set of one or more routes of the backhaul network, and one route of the set of routes comprises a prefix of the remote IP address. The one route is the more optimal route as it provides a shorter path to the remote base station through the backhaul network compared to a less optimal route through a mobile core network previously used for the inter-base station traffic. The method also includes installing a route entry into a routing table of the network device based upon the one route.

According to an embodiment of the invention, a network device is to be communicatively coupled to a set of one or more local base stations at a cell site and configured to automatically create more optimal route entries for inter-base station traffic to be transmitted between the set of local base stations and a set of one or more remote base stations through a backhaul network. The network device includes a set of one or more network interfaces and an address discovery module coupled to the set of network interfaces. The address discovery module is configured to automatically discover, based upon traffic transmitted by the set of local base stations destined to the network device or based upon traffic transmitted between the set of local base stations and the set of remote base stations, remote IP addresses of the set of remote base stations that are used for the inter-base station traffic. The network device also includes an automatic routing module coupled to the set of network interfaces. The automatic routing module is configured to transmit, using the set of network interfaces in response to the address discovery module automatically discovering the remote IP addresses of the set of remote base stations, outbound route filtering (ORF) requests to a second network device serving as a route reflector in the backhaul network. This causes the second network device to filter which routes it transmits to the network device according to the ORF requests. The ORF requests indicate that the network device seeks route updates for routes encompassing the remote IP addresses. The automatic routing module is further configured to receive, using the set of network interfaces, route update messages transmitted by the second network device. The route update messages follow a routing protocol and include sets of one or more routes of the backhaul network. The sets of routes of the backhaul network comprise prefixes of the remote IP addresses. The sets of routes are more optimal routes as they provide shorter paths to the set of remote base stations through the backhaul network compared to less optimal routes through a mobile core network previously used for the inter-base station traffic. The automatic routing module is further configured to install route entries into the routing table of the network device based upon the sets of routes received in the route update messages.

According to an embodiment of the invention, a cell site router (CSR) is to be communicatively coupled to a set of one or more local Evolved Node Bs (eNBs) at a cell site and configured to automatically create more optimal route entries for X2 traffic to be transmitted between the set of local eNBs and a set of one or more remote eNBs through a Long Term Evolution (LTE) backhaul network. The X2 traffic comprises X2 Application Protocol (X2AP) traffic and X2 user plane (X2-U) traffic. The CSR includes a set of one or more network interfaces, and an address discovery module coupled to the set of network interfaces. The address discovery module is configured to automatically discover, based upon traffic transmitted by the set of local eNBs destined to the CSR or based upon traffic transmitted between the set of local eNBs and the set of remote eNBs, remote X2 IP addresses of the set of remote eNBs that are used for the X2 traffic. The network device also includes an automatic routing module coupled to the set of network interfaces that is configured to insert, responsive to the address discovery module discovering one of the remote X2 IP addresses of the set of remote eNBs, an entry into an route import map representing the one remote X2 IP address. The route import map is to be utilized by the CSR to identify routes distributed according to a routing protocol that are to be installed into a routing table of the CSR. The automatic routing module is also configured to receive, using the set of network interfaces, route update messages following the routing protocol that include routes of the backhaul network. One or more of the routes are more optimal routes as they provide shorter paths to the set of remote eNBs through the backhaul network compared to less optimal routes through a mobile core network previously used for the X2 traffic. The automatic routing module is also configured to install route entries into the routing table of the CSR based upon determining that the one or more of the routes of the received route update messages match entries of the route import map.

According to an embodiment of the invention, a CSR is to be communicatively coupled to a set of one or more local eNBs at a cell site and configured to automatically create more optimal route entries for X2 traffic to be transmitted between the set of local eNBs and a set of one or more remote eNBs through an LTE backhaul network. The X2 traffic includes X2 Application Protocol (X2AP) traffic and X2 user plane (X2-U) traffic. The CSR includes a set of one or more network interfaces and an address discovery module coupled to the set of network interfaces. The address discovery module is configured to automatically discover, based upon traffic transmitted by the set of local eNBs destined to the CSR or based upon traffic transmitted between the set of local eNBs and the set of remote eNBs, remote X2 IP addresses of the set of remote eNBs that are used for the X2 traffic. The CSR also includes an automatic routing module coupled to the set of network interfaces, and is configured to transmit, using the set of network interfaces in response to the address discovery module automatically discovering the remote X2 IP addresses of the set of remote eNBs, outbound route filtering (ORF) requests to a route reflector in the backhaul network to cause the route reflector to filter which routes it transmits to the CSR according to the ORF requests. The ORF requests indicate that the CSR seeks route updates for routes encompassing the remote X2 IP addresses. The automatic routing module is also configured to receive, using the set of network interfaces, route update messages transmitted by the route reflector. The route update messages follow a routing protocol and include sets of one or more routes of the backhaul network. The sets of routes of the backhaul network comprise prefixes of the remote IP addresses, and the sets of routes are more optimal routes as they provide shorter paths to the set of remote eNBs through the backhaul network compared to less optimal routes through a mobile core network previously used for the X2 traffic. The automatic routing module is also configured to install route entries into the routing table of the CSR based upon the sets of routes received in the route update messages.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
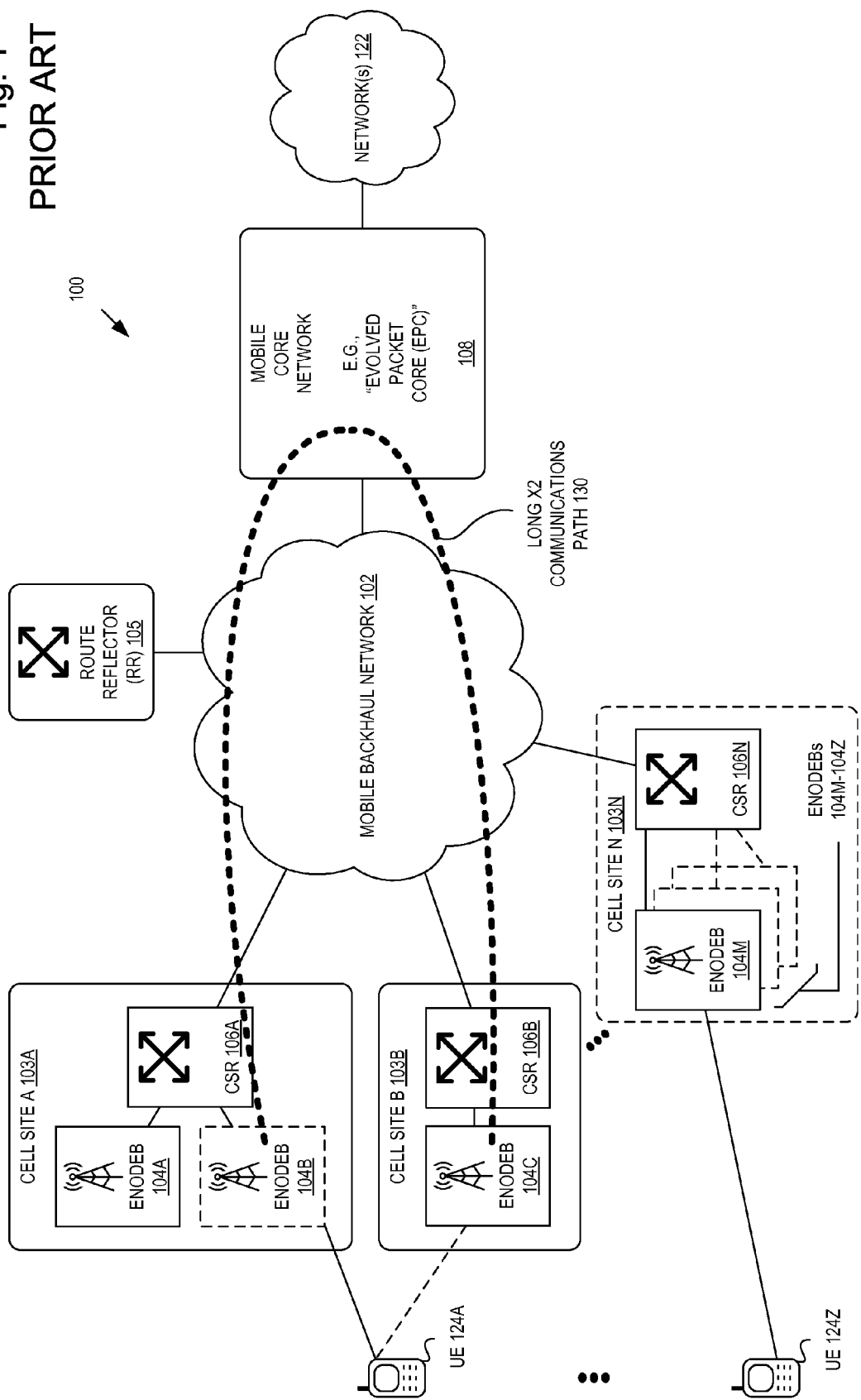
FIG. 1 illustrates an exemplary network including plurality of cell sites coupled to a mobile core network through a mobile backhaul network according to the prior art.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, in the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the figures, bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

A VPN is typically referred to as a collection of sites with the same access and security policies over the same or different infrastructures. VPNs can be set up on Layer 2 or Layer 3 of the Open Systems Interconnection (OSI) model. Some types of Layer 2 VPNs include Layer 2 Tunneling Protocol (L2TP), Leased Lines (LL), Permanent Virtual Circuits (PVCs) set up with Asynchronous Transfer Mode (ATM or Frame Relay), and Any Transport over MPLS (AToM). Some types of Layer 3 VPNs include Generic Routing Encapsulation (GRE), and IP-in-IP. Border Gateway Patrol (BGP)-based Layer 3 VPNs over MPLS are often used because MPLS can provide converged infrastructure with an ability to support many types of applications.

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., an exterior gateway protocol such as BGP (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other network devices to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries that are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

Typically, a network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec) (RFC 4301 and 4309), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

Nodes are implemented in network devices. A physical node is implemented directly on the network device, whereas a virtual node is a software, and possibly hardware, abstraction implemented on the network device. Thus, multiple virtual nodes may be implemented on a single network device.

A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port coupled to a network interface controller (NIC)). Typically, a network device has multiple physical network interfaces. A virtual network interface may be associated with a physical network interface, with another virtual interface, or stand on its own (e.g., a loopback interface, a point to point protocol interface). A loopback interface (and its loopback address) is a specific type of virtual network interface (and IP address) of a node (physical or virtual) often used for management purposes, where such an IP address is referred to as the nodal loopback address. The IP address(es) assigned to the network interface (s) of a network device, are referred to as IP addresses of that network device; at a more granular level, the IP address(es) assigned to network interface(s) assigned to a node implemented on a network device, can be referred to as IP addresses of that node.

Embodiments of the present invention provide mechanisms for automatically discovering, by cell site routers (CSRs), X2 IP addresses of remote eNodeBs for which the local eNodeBs have or will require inter-eNodeB connectivity with (e.g., X2 relations). Embodiments of the invention further provide mechanisms for using the discovered IP addresses to automatically create network routes, such as Virtual Private Network for IPv4 (VPNv4) routes, and to automatically create the associated Virtual Routing and Forwarding (VRF) table routing entries to provide optimized connectivity for the X2 interfaces defined at the eNodeBs. By automatically creating network routes, the need to manually create specific routes at the CSRs, border routers, and route reflectors of the network is removed, which would otherwise be required to control the scaling of state in a LTE transport service. In addition, embodiments of the invention provide mechanisms for automatically removing the automatically created routes when such routes are no longer required by the eNodeBs. Various embodiments of the present invention also include mechanisms for automatically configuring security tunnels (e.g., IP security (IPsec) tunnels) for securing the automatically created network routes between the CSRs, and some embodiments automatically configure cell site local security tunnels between a CSR and its local eNodeBs. Throughout the description, the present invention is described by way of example in the context of CSRs and eNodeBs. However, it will be appreciated that the present invention is not so limited, and can be extended to apply to other types of network devices communicatively coupled to other types of base stations in other types of networks.

Embodiments of the present invention provide multiple advantages, including, enabling operational simplicity and reducing configuration efforts at the CSRs, reducing memory requirements at the CSRs, reducing processing requirements at the CSR, reducing latency of X2 traffic between eNodeBs, eliminating the need to hair-pin a large amount of X2 traffic to local/regional switching sites for inter-base station traffic, automatically enabling the use of encrypted security tunnels for the new routes, and eliminating the dependency between radio network and transport network planning.

Throughout the description, the terms "local" and "remote" are used to describe various network devices and are relative to a particular network device such as a CSR, which will be described in further detail below. Additionally, the terms "long" and "short" are used in this description to describe network routes. As used herein, the term "long" is used to describe a network route that is inferior to another route to a same destination. In one use, a "long" route includes more network hops than are technically required between a first network device that originates a packet and a second device for which the packet is intended. As an example, in one context a "long" route might include transmitting traffic from a first eNodeB to a second eNodeB all the way back through a mobile backhaul network to a switching device in the EPC core network, and wherein the traffic may then "hairpinned" be back through the mobile backhaul network to the second eNodeB. The term "short" is used herein to describe a network route that is comparatively superior to a "long" route. A short route typically includes fewer network hops than a respective long route. For example, in one context a "short" route might include transmitting traffic from a first eNodeB to a second eNodeB directly through a mobile backhaul network without the path crossing into the EPC core network. A short route may or may not be an optimal or shortest path route, but the term is instead used to indicate that the route is comparatively superior (e.g., shorter, less congested, faster, cheaper, more reliable) to a particular "long" route.

FIG. 1 illustrates an exemplary network 100 including plurality of cell sites 103A-103N coupled to a mobile core network 108 through a mobile backhaul network 102 according to the prior art. This exemplary network 100 is presented herein to aid in illustrating how aspects of the invention may be utilized; however, embodiments of the invention are useful in other network configurations as well. As illustrated, the exemplary network 100 is an LTE network, but some embodiments of the invention may be utilized in other types of networks (e.g., a third generation (3G) network). In this depicted LTE network 100, users utilize UE devices 124A-124Z to access one or more networks 122 (e.g., the Internet, a provider network, etc.) through wireless connections with one or more radio base stations (i.e., eNodeBs 104A-104Z). In the exemplary network 100, one eNodeB (e.g., eNodeB 104C) may exist at a cell site (e.g., cell site 103B), or multiple eNodeBs (e.g., eNodeBs 104A-104B) may be "local" to one cell site (e.g., cell site 103A). Each of the cell sites (e.g., cell site 103A) includes a cell site router (e.g., CSR 106A), which manages the connection between the RAN nodes operating at the cell site 103A (e.g., eNodeBs 104A-104B) and the backhaul link through the mobile backhaul network 102 to the mobile core network 108 (e.g., an LTE Evolved Packet Core (EPC)). In some embodiments of the invention utilized in such an exemplary network 100, the CSRs 106A-106N are enabled to utilize the BGP routing protocol, and in some embodiments, the mobile backhaul network 102 can be an MPLS network, a H-MPLS network, an IP network, an Open-Flow network, etc., and may utilize MPLS-based Layer 3 VPNs (L3VPNs).

In this exemplary network 100, the CSRs 106A-106N are communicatively coupled to route reflector (RR) 105 via network 102. A route reflector 105 is a network router that is configured to act as a focal point for Internal Border Gateway Protocol (IGBP) sessions. For example, multiple BGP routers (e.g., CSRs 106A-106N) peer with the route reflector 105 rather than creating a full mesh peering with every other BGP router in the network, which provides large networks with IBGP scalability. Route reflectors are well known in the art, and for the sake of brevity, will not be discussed in full detail herein. However, a route reflector 105 is not used in some embodiments of the invention.

UE devices 124A-124Z may be coupled to more than one eNodeB 104A-104Z at any point in time. In some scenarios, a UE device 124A may be connected to multiple eNodeBs (e.g., eNodeBs 104B-104C) while the UE device 124A is physically moving away from the first eNodeB 104B and closer to the second eNodeB 104C (e.g., a handover scenario). In other scenarios, such as LTE CoMP, a UE device 124A may be connected to multiple eNodeBs 104B-104C at once to allow communications between the UE device 124A and one or more of the eNodeBs 104B-104C, which may lead to a better utilization of the network, enhanced reception performance, increased reception power, and/or a reduction of signal interference.

This exemplary network 100 also depicts the typical path of communications utilized between eNodeBs (e.g., 104B-104C) for inter-eNodeB X2 traffic. As illustrated, the X2 traffic follows a long X2 communications path 130 from a first eNodeB 104B, through the CSR 106A at its cell site 104A, through the mobile backhaul network 102, and into the mobile core network 108, where it is switched back through the mobile backhaul network 102, through another CSR 106B at a second cell site 103B, and to the second eNodeB 104C. This long X2 communications path 130 is typically used for X2 traffic because of the tremendous administrative complexity and burden for manually implementing and maintaining static routes between eNodeBs for X2 traffic. Thus, when such X2 traffic originated by an eNodeB (e.g., eNodeB 104B) and received by its local CSR 106A, typically no designated route for that traffic exists in a routing table of the CSR 106A, and thus the CSR 106A will utilize its default route and transmit the traffic back into the mobile core network 108 (e.g., to a S-GW, for example), where a proper route for the X2 traffic may be determined Embodiments of the invention eliminate this tremendous administrative complexity and burden for manual implementation and maintenance of X2 routes, and can prevent X2 traffic from following such a long X2 communications path 130.

Figure 2:
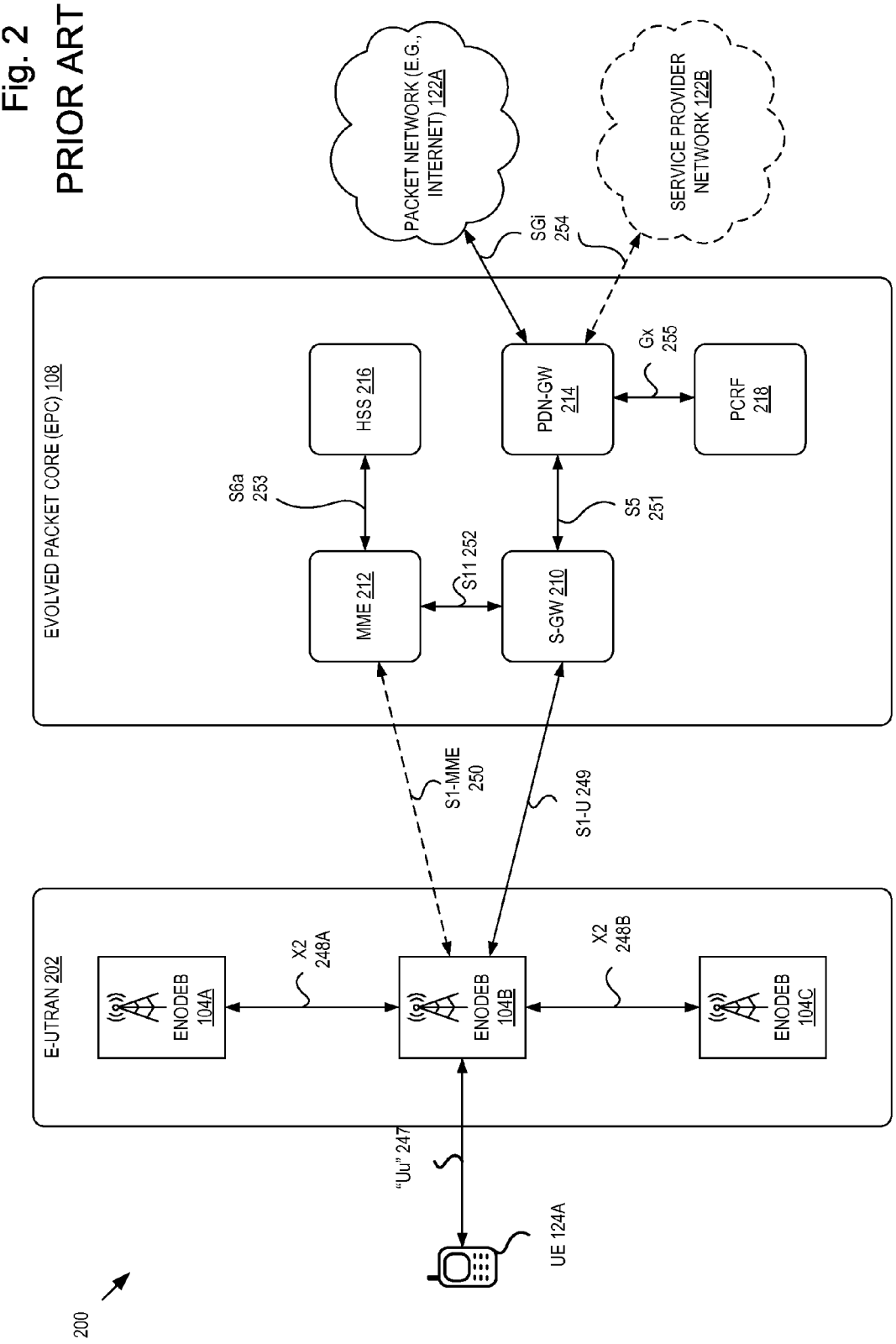
FIG. 2 illustrates nodes and common interfaces between nodes of an E-UTRAN and a mobile core network within a LTE network 200 according to the prior art.

FIG. 2 illustrates nodes and common interfaces between nodes of an E-UTRAN 202 and a mobile core network (e.g., EPC 108) within a LTE network 200 according to the prior art, which is presented herein for ease of understanding of aspects of the invention. It is possible, but not necessary, that the LTE network 200 of FIG. 2 is the same as the LTE network 100 of FIG. 1. Just as in the LTE network 100 of FIG. 1, a UE device 124A communicates with eNodeBs 104A-104C of the E-UTRAN 202 over a "Uu" interface 247. The eNodeBs 104A-104C are operable to communicate with each other over "X2" interfaces 248A-248B.

The eNodeBs 104A-104C, through a backhaul network (not illustrated herein), communicate with a S-GW 210 of the EPC 108 over a "S1-U" interface 250, and may also communicate with a MME 212 over a "S1-MME" interface 250. In some configurations, the MME 212 is responsible for initiating paging and authentication of the UE device 124A (perhaps by using "S6a" interface 253 to interact with a Home Subscriber Server (HSS) 216, which is a central database that contains user-related and subscription-related information), and may store location information at the tracking area level for each user and also select the appropriate S-GW 210 for the UE device 124A during the initial registration process. The S-GW 210 may be coupled over a "S5" interface 251 to a PDN-GW 214, which provides the UE device 124A with connectivity to one or more networks over an "SGi" interface 254. These networks may include a packet network 122A (e.g., the Internet), a service provider network 122B offering particular services, or some other public or private network. The role of the PDN-GW 214 is to provide connectivity from the UE device 124A to external packet data networks (e.g., 122A-122B) by being the point of exit and entry of traffic for the UE device 124A. A UE device 124A may have simultaneous connectivity with more than one PDN-GW 214 for accessing multiple networks. The PDN-GW 214, in some configurations, performs policy enforcement, packet filtering for each user, charging support, lawful interception, and/or packet screening. The PDN-GW 214 may interact with a Policy and Charging Rules Function (PCRF) 218 over a "Gx" 255 interface to implement policy control and flow based charging control decisions. Of course, many other nodes may be utilized in an LTE-type network 200, and in some LTE-type networks one or more of these nodes are not required. Additionally, any of these nodes may be implemented as software and/or hardware, and each node may be implemented using one or more electronic device, or several nodes may be implemented by just one electronic device.

Having presented some exemplary networks, aspects of the invention will now be described, starting with a flow presented by FIG. 3. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

Figure 3:
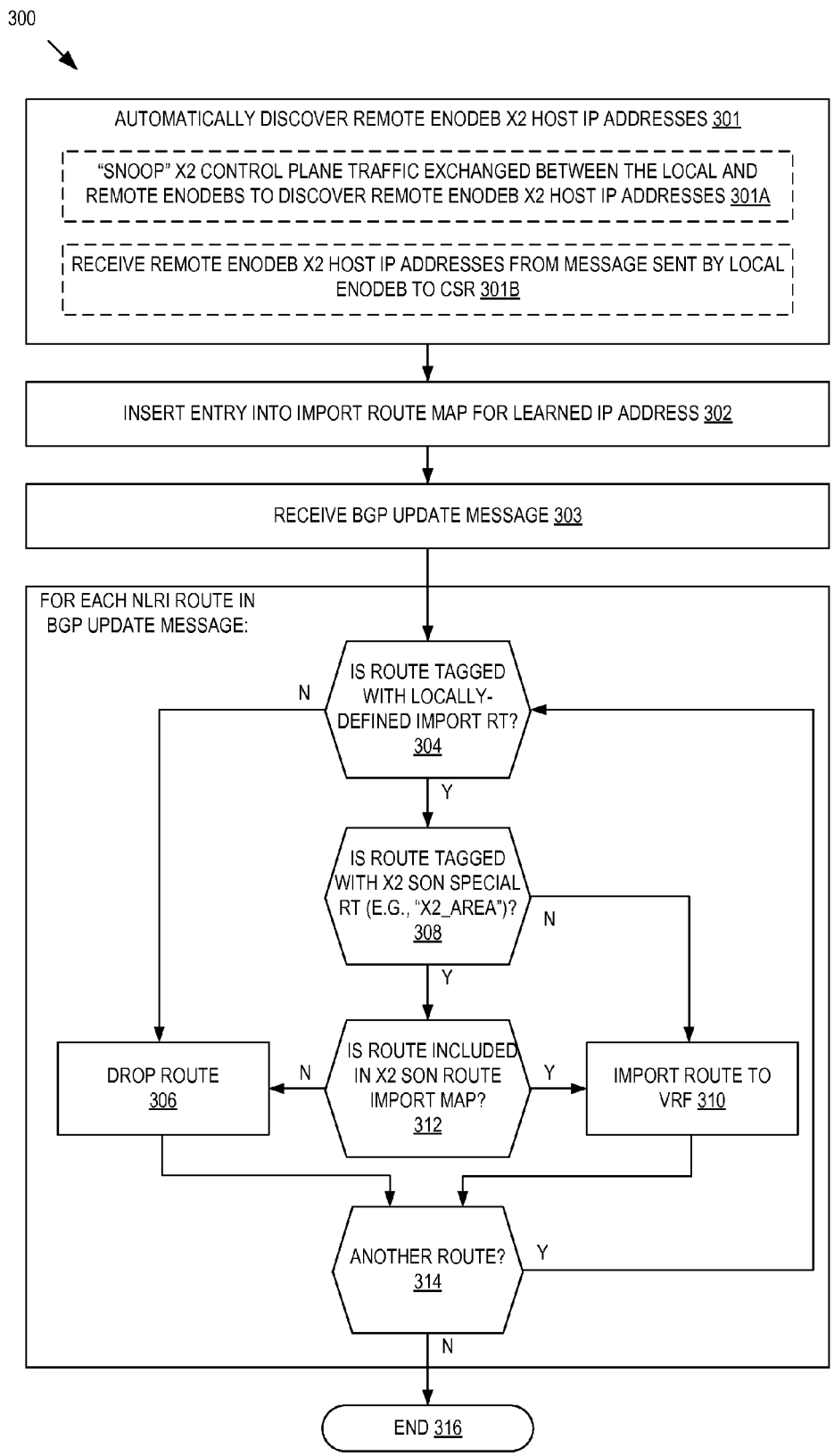
FIG. 3 illustrates a flow for automatic VRF route creation using selective import logic subsequent to the discovery of remote X2 addresses of remote base stations according to an embodiment of the invention.

FIG. 3 illustrates a flow 300 for automatic VRF route creation using selective import logic subsequent to the discovery of remote X2 addresses of remote base stations according to an embodiment of the invention. In an embodiment of the invention, the flow 300 is performed by a local CSR (e.g., CSR 106A) having at least a local eNodeB (e.g., eNodeB 104B) that has or is beginning an X2 relation (i.e., connection) with a remote eNodeB (e.g., eNodeB 104C) that is served by a remote CSR (e.g., CSR 106B). In an embodiment, the flow 300 includes automatically discovering 301, by the CSR 106A, an X2 host IP address of the remote eNodeB 104C. This process is referred to herein as X2 topology discovery. The X2 relation at a local eNodeB can initially be created in several ways, including by way of example and not limitation, by conventional Operations and Maintenance (OAM), Neighbor Relation (NR), and Transport Network Layer (TNL) Automatic Neighbor Relation (ANR). In response to discovering a remote X2 IP address, the local CSR 106A may then configure a new short path/route to the remote CSR 106B for the X2 traffic flow corresponding to the discovered X2 IP address. In an embodiment, this automatic discovery 301 is also performed at the remote CSR 106B, where it learns X2 host addresses of eNodeBs supported by the local CSR 106A.

In an embodiment, the automatic discovery 301 (or, X2 topology discovery) is performed by a local CSR 106A that performs "snooping" 301A of X2 traffic (e.g., X2 control plane (X2-C) traffic) exchanged between the local eNodeB 104B and remote eNodeB 104C. As used herein, "snooping" refers to the parsing/processing of packets received by the CSR 106A but not ultimately destined to the CSR 106A, which may include analyzing a packet to determine its packet type. In such embodiments, the local CSR 106A determines if a configuration of a more optimal path/route for X2 traffic would be beneficial by snooping X2-C packets that it receives. In an embodiment, X2-C packets are exchanged between eNodeBs using the Streaming Control Transmission Protocol (SCTP) protocol using a format specified by 3GPP, which can thusly be identified as such by the local CSR 106A by looking for packets matching that particular format.

In an embodiment where X2 topology discovery is performed by snooping X2-C traffic 301A, the local CSR 106A identifies "SCTP INIT ACK" chunks exchanged over the X2-C interface. Typically, "SCTP INIT ACK" packets are exchanged when eNodeBs are in the process of creating a new SCTP association (or re-initiating a downed SCTP association) over which future X2-AP traffic will flow. Each SCTP packet carrying a SCTP INIT ACK packet includes an IP header, an SCTP header, and one or more SCTP chunks, each chunk being identified by a chunk type/ID. In the case of an SCTP INIT or SCTP INIT ACK packet, there is only one SCTP chunk per SCTP packet.

In an embodiment, an SCTP INIT ACK packet is defined by an SCTP packet with a protocol field having the value "132", an SCTP source port field and a SCTP destination port field both having the value "36,422", and a chunk type/ID having the value "2". Each SCTP packet includes a source IP address field and a destination IP address field as part of its IP header. Depending on whether the SCTP INIT ACK originated from the local eNodeB 104B or the remote eNodeB 104C, either the IP address contained in the source IP address field or the destination IP address contained in the destination IP address field is accessed by the local CSR 106A and used as the discovered remote X2-C IP address.

In some embodiments, once the SCTP association between the local eNodeB 104B and the remote eNodeB 104C has been established, the local CSR 106A performs the "snooping" 301A by identifying X2-AP messages exchanged between the eNodeBs 104B-104C over the X2-C interface, and thusly discovers the X2 IP address of the remote eNodeB 104C by accessing an IP address that is included in particular fields of particular X2-AP messages.

According to an embodiment, the local CSR 106A snoops 301A X2-AP packets carrying a HANDOVER REQUEST or HANDOVER REQUEST ACK packet. A HANDOVER REQUEST packet is defined by an X2-AP packet with a procedure code field having the value "0", and a message value field having the value "HandoverRequest". In an embodiment, upon detecting that HANDOVER REQUEST packet has been sent from a local eNodeB 104B, the local CSR 106A will be configured to examine return traffic that might include a HANDOVER REQUEST ACK packet. A HANDOVER REQUEST ACK packet is defined by an X2-AP packet with a procedure code field having the value "0", and a message value field having the value "HandoverRequestAcknowledge". Each HANDOVER REQUEST ACK message includes an information element (IE) that includes the Transport Network Layer (TNL) information for the remote eNodeB 104C to use for a GPRS Tunneling Protocol—User Plane (GTP-U) tunnel when forwarding data to the local eNodeB 104B that transmitted the initial HANDOVER REQUEST packet. The TNL information includes, for example, a transport layer address. In an embodiment, when a HANDOVER REQUEST ACK is received from a remote eNodeB 104C, the local CSR 106A discovers the X2-U IP address of the remote eNodeB 104C by accessing the IP address carried in the transport layer address field.

Although snooping 301A is discussed herein with respect to SCTP INIT ACK and HANDOVER REQUEST ACK packets, it will be appreciated that other formats and message types can be used without departing from the broader scope and spirit of the present invention. In other embodiments, other types of packets that are transmitted between the local eNodeB 104B and the remote eNodeB 104C may carry the relevant X2 IP address information, and similar logic rules may be crafted to identify that X2 IP address information.

In some embodiments utilize snooping for automatic X2 topology discovery, routes may be automatically removed in the CSR when they are no longer necessary. Just as in eNodeBs, CSRs may be configured to age out routes a fixed amount of time after they are created, or after a defined period of inactivity. In embodiments of the invention, if a route is incorrectly removed before the X2 communication has completed, the X2 signaling and the GTP-U transfer will still occur through the X2 long path VPNv4 route. Thus a prematurely deleted X2 short path route(s) will immediately and automatically get re-created through the above-described snooping procedures in the same way as for completely new X2-C/U flows.

In an embodiment, the automatic X2 topology discovery 301 is performed through an explicit signaling communication occurring between eNodeBs and their local CSRs. In such an embodiment, the CSRs and their local eNodeBs establish dedicated connection-oriented interfaces, over which remote X2 IP addresses are explicitly communicated by the eNodeBs to the local CSRs.

In an embodiment, either the local eNodeB 104B or the local CSR 106A may initiate a connection by transmitting a HELLO message and waiting for receipt of a HELLO (or HELLO ACK) message in response, though many other procedures for establishing a connection may be used that are well known to those of skill in the art. In an embodiment, after establishing a connection, the local eNodeB 104B transmits a "CONNECT" message to the local CSR 106A including a set of one or more "remote IP addresses" that includes one or more remote X2 IP addresses to which the local eNodeB 104B requires X2 connectivity. The transmission of this CONNECT message occurs, in an embodiment, when an SCTP association is about to be established for an X2 interface or when a new user plane GTP-U IP address has been signaled by a remote eNodeB 104C to a local eNodeB 104B. In an embodiment where IPsec tunnel mode is used and the IPsec tunnel is terminated at the eNodeB on both ends, then in an embodiment the CONNECT message also includes, as part of the list of "remote IP addresses", the remote tunnel end point address used for each X2 interface that the local eNodeB 104B has a definition for. In one embodiment, the CONNECT message also includes an optional set of "own IP addresses", which includes one or more IP addresses of the local eNodeB 104B, to aid the local CSR 106A in configuring routes. To communicate a removal or change of a local or remote X2 IP addresses, the local eNodeB 104B transmits a new CONNECT message with the updated set of own/remote IP addresses. In such an embodiment, the local CSR 106A infers new and/or removed IP addresses by comparing the list of own/remote IP addresses contained in the latest CONNECT message against the list of own/remote IP addresses contained in a previously received CONNECT message.

In some instances, when the local CSR 106A and/or local eNodeB 104B needs to be taken down (e.g., for maintenance or replacement), the connection-oriented interface will be interrupted. When the connection-oriented interface is re-established, the local eNodeB 104B re-transmits a CONNECT message that is a duplicate of a previous CONNECT message (i.e., the CONNECT messages contain the exact same set or sets of IP addresses). In one embodiment, the local CSR 106A detects such a duplicate CONNECT message and ignores it.

After automatically discovering 301 the remote eNodeB X2 host IP addresses, the flow 300 continues with inserting 302 an entry into an import route map for the learned IP address.

In such embodiments where the automatic X2 topology discovery 301 is performed through an explicit signaling communication occurring between eNodeBs and their local CSRs, routes may be automatically removed by configuring the eNodeBs to explicitly signal the its local CSR to remove the X2-specific VPNv4 routes when it determines that the X2 interface is no longer required. In scenarios where an eNodeB utilizes different X2-U and X2-C IP address, an amount of lag based upon hysteresis is incorporated before a local eNodeB releases a X2-U route after it releases the associated E-UTRAN Radio Access Bearer (E-RAB) (i.e. after a handoff is complete).

In an embodiment, the local CSR 106A utilizes BGP (or Multiprotocol BGP (MP-BGP)) routing and thus receives advertised network routes from other network devices or from a route reflector 105. In an embodiment, the local CSR 106A is configured to utilize a route target (RT) import filter that includes a set of RTs indicating which advertised routes will be installed. In addition to the RT import filter, an embodiment of the invention further utilizes an import route map to restrict which advertised routes will be installed into the VRF table of the local CSR 106A. The import route map includes a match condition representing specific IP addresses or prefixes that the local CSR 106A wishes to install routes for. Thus, the local CSR 106A will insert an entry into the import route map representing the learned remote eNodeB X2 host IP address, which in an embodiment can be the full IP address, a subnet including the IP address, or some other related prefix.

Accordingly, upon receiving 303 a BGP route update message advertised into the network containing Network Layer Reachability Information (NLRI) comprising one or more advertised routes, the local CSR 106A will perform the following for each such route. At step 304, the local CSR 106A will determine if the route is tagged with a locally-defined import route target, i.e., if the route is tagged with a RT in the RT import filter. If not, the local CSR 106A will drop 306 (i.e., ignore) the route and proceed to determine 314 if another route in the BGP route update message exists. If not, the process ends 316; otherwise, the next route is similarly examined to determine 304 if it is tagged with a locally-defined import RT.

When a route is tagged with a locally-defined import RT, the flow 300 continues with determining 308 if the route is tagged with an X2 Self-Organizing Network (SON) special route target. In an embodiment, within a given geographic area "X2_Area", each of the CSRs will export their local subnets with the same RT "X2_Area" into BGP, and in an embodiment they do not export more specific routes for X2 IP addresses when locally learned. In such embodiments, "X2_Area" is a special RT value defined by the operator when the herein described auto-discovery SON feature is enabled in the CSR. If the route is not tagged with the X2 SON special route target, the route is known to be a "regular" route of interest, and thus is imported into the VRF table 310.

However, in an embodiment, if the route is tagged with the X2 SON special RT, the flow 300 continues with determining 312 whether the route matches an entry in the route import map (e.g., an entry inserted into the route import map by the local CSR 106A after learning a remote X2 IP address). If not, the route is dropped 306, otherwise the route is imported 310 to the VRF table of the local CSR 106A.

In some embodiments, within a given geographic area (e.g., "X2_Area"), each of the CSRs will export their local subnets with the same RT "X2_Area" into MP-BGP, though they will not export more specific routes for X2 IP addresses when locally learned. The BGP UPDATE messages received by a given CSR include all subnets advertised by all the CSRs exporting their locally reachable subnets with the area wide RT "X2_Area". Thus, all routes are propagated but the local CSR restricts the routes it actually installs through the use of local import route map filters. Additionally, although the BGP UPDATE message includes all the CSRs' locally reachable subnets, only routes that are also in the import route map of the local CSR 106A are actually installed in its VRF. One important benefit to the use of this flow 300 is that this method does not increase the number of routes advertised in to MP-BGP.

Figure 4:
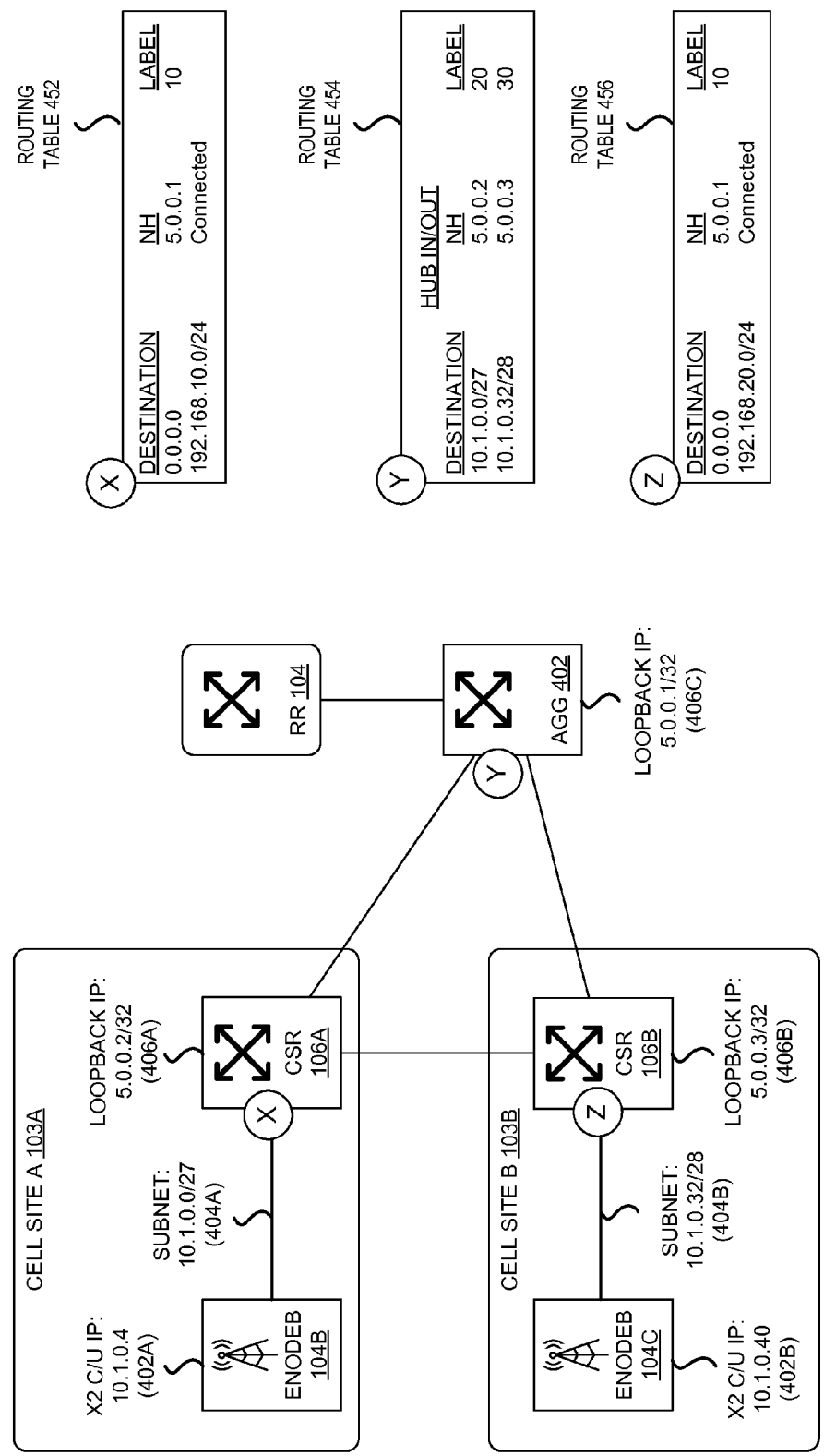
FIG. 4 illustrates an exemplary network utilizing the method of FIG. 3 according to an embodiment of the invention.

FIG. 4 illustrates an exemplary network 400 utilizing the method of FIG. 3 according to an embodiment of the invention. The exemplary network 400 includes a first cell site 103A including a CSR 106A having a loopback IP address of "5.0.0.2/32" 406A, which provides connectivity for a subnet "10.1.0.0/27" 404A that includes an eNodeB 104B having one (control and user plane) X2 IP address of "10.1.0.4" 402A. As illustrated by circle 'X', the CSR 106A has a routing table 452 with two entries—an entry for a default route leading to an aggregate router 402 using a label "10", and an entry for a private class C subnet of "192.168.10.0/24" which is connected to the CSR.

The exemplary network 400 also includes a second cell site 103B including a CSR 106B having a loopback IP address of "5.0.0.3/32" 406B, which provides connectivity for a subnet "10.1.0.32/28" 404B that includes an eNodeB 104C that also has one (control and user plane) X2 IP address of "10.1.0.40" 402B. As illustrated by circle 'Z', the CSR 106B has a routing table 456 with two entries—an entry for a default route leading to the aggregate router 402 using a label "10", and an entry for a private class C subnet of "192.168.20.0/24" that is connected to the CSR.

Each of the CSRs 106A-106B is communicatively coupled with an aggregate router 402 having a loopback IP address of "5.0.0.1/32" 406C, which is further coupled with a route reflector 104. As illustrated by circle 'Y', the aggregate router 402 has a routing table 454 including two entries—an entry for the subnet 404A behind the first CSR 106A indicating the first CSR 106A is the next hop and that label "20" is to be used, and an entry for the subnet 404B behind the second CSR 106B indicating that the second CSR 106B is the next hop and that label "30" is to be used.

Figure 5:
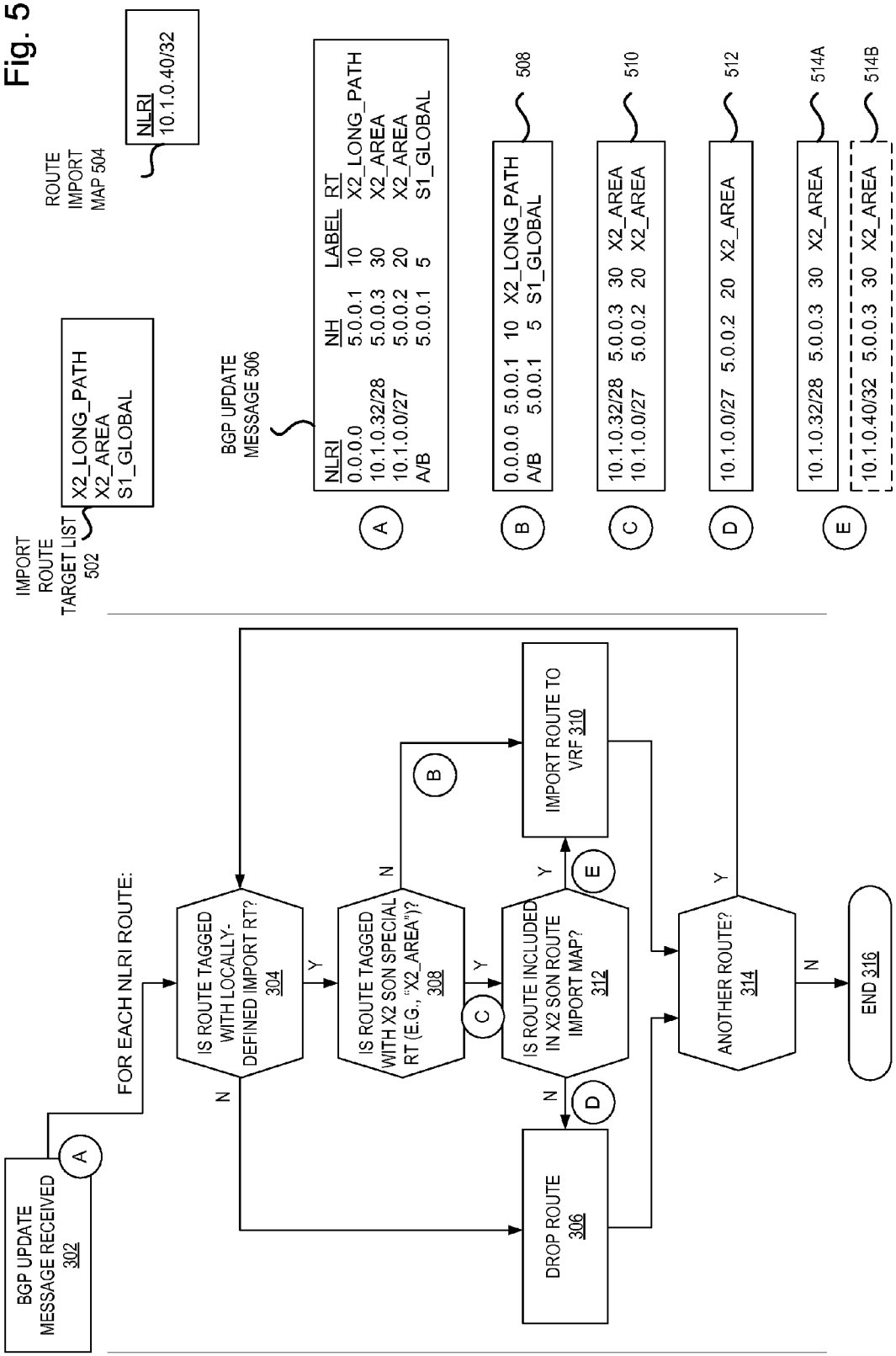
FIG. 5 illustrates an exemplary operational scenario of the network of FIG. 4 utilizing the method of FIG. 3 according to an embodiment of the invention.

FIG. 5 illustrates an exemplary operational scenario of the network of FIG. 4 utilizing the method of FIG. 3 according to an embodiment of the invention. This illustration is presented with respect to the first CSR 106A of FIG. 4, which we will state includes an import route target list 502 that includes the special SON route target of "X2_Area" (as discussed above), and further includes a route import map 504 including an entry for the prefix of "10.1.0.40/32" (matching the X2 IP address 402B of the second eNodeB 104A), which was inserted into the route import map 504 by the first CSR 106A after discovering the remote X2 IP address of the second eNodeB 104C.

At step 302 and circle 'A', the first CSR 106A receives a BGP update message 506, the content of which is illustrated at 506. This BGP update message 506 includes four entries. As the flow iterates to process the BGP update message 506, these four entries will be processed as follows.

First, as illustrated by circle 'B', the first entry and the last entry 508 will be imported into the VRT because they each are tagged with a locally-defined import RT (i.e., both "X2_LONG_PATH" and "S1_GLOBAL" are RT values that exist in the import route target list 502 of the first CSR 106A) and neither is tagged with the X2 SON Special RT of "X2_AREA". Thus, step 304 will result in "Y" and step 308 will result in a "N".

As illustrated by circle 'C', the second and third entries 510 of the BGP update message 506 are each tagged with the RT value of "X2_AREA", indicating that they are part of the SON auto-discovery implemented by aspects of the invention. Thus, for the second and third entries 510, step 304 will result in "Y" and step 308 will result in a "Y". Now, the flow continues with determining whether the route is included within the X2 SON route import map 504.

The third entry 512, at circle 'D', will end up being dropped because its NLRI prefix does not match the entry in the route import map 504. This result is valid, as the route is for the subnet 404A already reachable through the first CSR 106A, and thus the third entry was already known to the first CSR 106A and likely advertised into BGP by the first CSR 106A. Thus, for the third entry 512, step 304 and 308 will result in a "Y", but step 312 will result in a "N".

The second entry for "10.1.0.32/28", however, at circle 'E' will be imported into the VRF table as it will match the entry in the route import map 504 (i.e., the route import map 504 entry of "10.1.0.40/32" is included within the "10.1.0.32/28" subnet of the second entry). Depending upon the embodiment, at this point the "/28" prefix of the second entry may be inserted into the VRF (see entry 514A), or just a "/32" address may be inserted into the VRF (see entry 514B).

Figure 6:
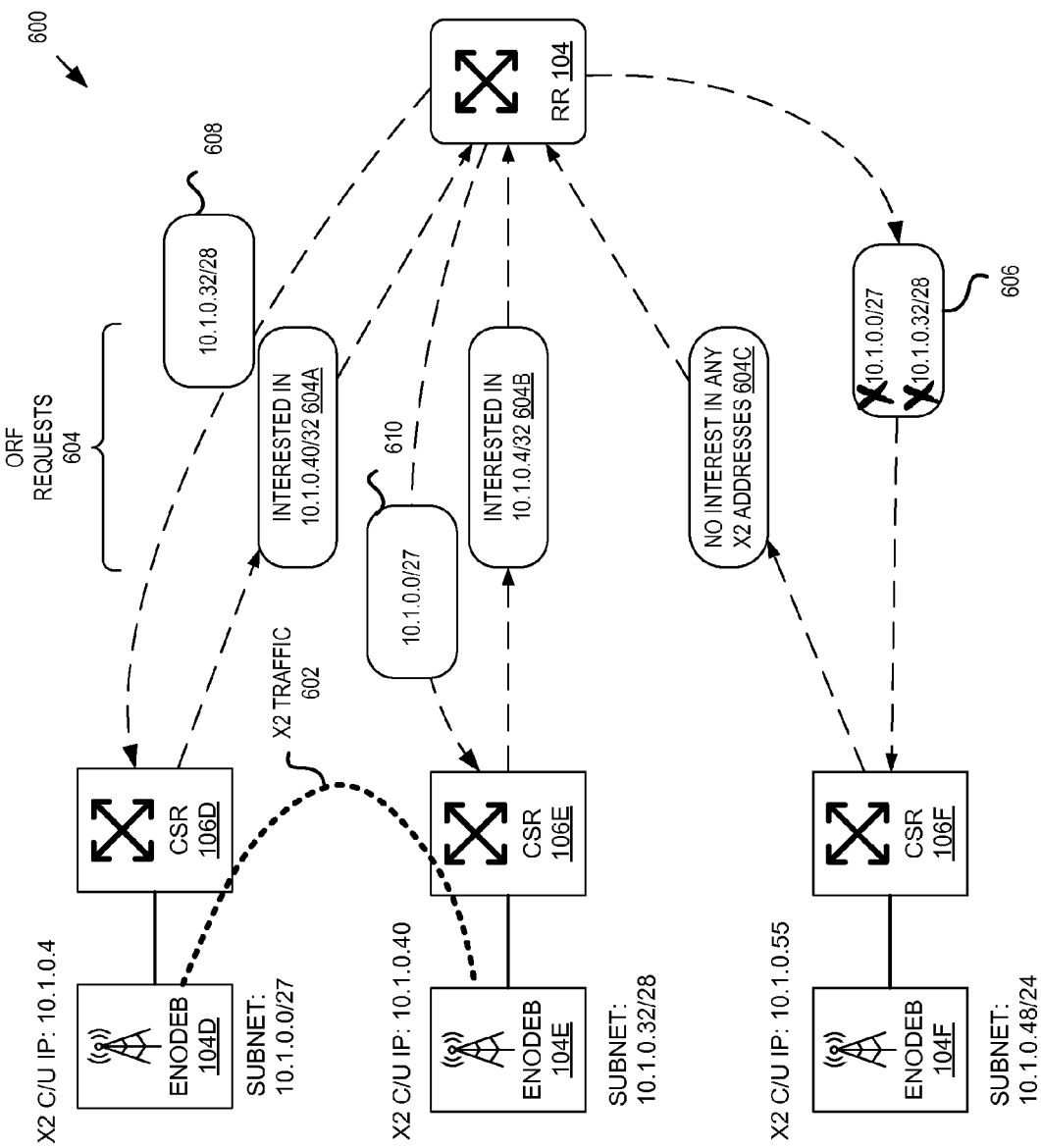
FIG. 6 illustrates an exemplary network for automatic VRF route creation using outbound route filtering subsequent to the discovery of remote X2 addresses of remote base stations according to an embodiment of the invention.

FIG. 6 illustrates an exemplary network 600 for automatic VRF route creation using outbound route filtering (ORF) subsequent to the discovery of remote X2 addresses of remote base stations according to an embodiment of the invention. As opposed to using route import maps to identify those routes of interest for automatically-discovered remote X2 IP address, FIG. 6 presents an embodiment of the invention utilizing ORF requests 604.

Outbound route filtering (ORF) enables a router to advertise to its peers outbound route filters that peering routers or RRs can use while sending information to the router. In such configurations, the ORF feature on routers works in conjunction with the route-refresh BGP capability.

In an embodiment of the invention, similar to embodiments using import route maps, within a given geographic area "X2_Area", CSRs export their local subnets with the same RT "X2_Area" into MP-BGP. However, in these embodiments, the propagation of VPNv4 routes from the RR to the CSRs is restricted through the use of ORFs by the RRs. Thus, the contents of the BGP update messages sent from the RR to the CSRs will be unique for each CSR and contain only the VPNv4 X2 routes required by a given CSR. Thus, when a local CSR learns about a new remote X2 address, it updates its ORF on the RR (through an ORF request message) to add this new address as a /32 subnet. One benefit to these embodiments is that the number of routes advertised in to MP-BGP also is not increased.

Turning to FIG. 6, the depicted network 600 includes three CSRs 106D-106F, each respectively having a local eNodeB 104D-104F. The first CSR 106D, by either "snooping" X2 traffic 602 or through an explicit communication with its local eNodeB 104D, automatically discovers the X2 IP address of a remote eNodeB 104E that the local eNodeB 104D has an X2 relation with. Accordingly, the first CSR 106D transmits an ORF request 604A to the route reflector 104 indicating that it is interested in receiving routes pertaining to the address "10.1.0.40/32", which is the X2 IP Address of the remote eNodeB 104E. Similarly, the second CSR 106E also automatically discovers the X2 IP address of the first eNodeB 104D, as it is a remote eNodeB to its local eNodeB (the second eNodeB 104E). Accordingly, it too will transmit an ORF request 604B indicating that it is interested in receiving routes pertaining to the address "10.1.0.4/32"—the automatically discovered X2 IP address of the first eNodeB 104D. Since the third eNodeB 104F does not have an active X2 relation with any other eNodeB, the third CSR 106F has not automatically discovered any remote X2 IP address, and thus can do nothing or else send an ORF request 604C indicating that it is not interested in any routes pertaining to X2 addresses.

In response, the RR 104 will only send to the first CSR 106D routes for prefixes including the IP address "10.1.0.40" (see BGP update 608) and will only send to the second CSR 106E routes for prefixes including the IP address "10.1.0.4" (see BGP update 610), but will not send any such routes to the third CSR 106F (see BGP update 606). Of course, the depiction of FIG. 6 is simplified for ease of understanding, and thus each of the ORF requests 604 may include other prefixes not related to automatically discovered remote X2 IP addresses.

Figure 7:
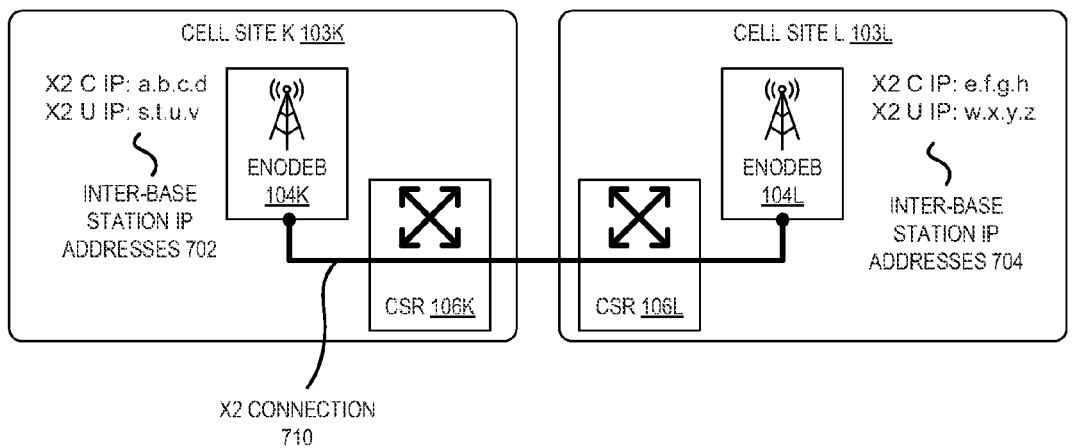
FIG. 7 illustrates an exemplary network for automatic VRF route creation using unique route target values subsequent to the discovery of remote X2 addresses of remote base stations according to an embodiment of the invention.

FIG. 7 illustrates an exemplary network 700 for automatic VRF route creation using unique route target values subsequent to the discovery of remote X2 addresses of remote base stations according to an embodiment of the invention. This exemplary network 700 includes a first cell site 103K having a CSR 106K with an eNodeB 104K having two different X2 IP addresses 702—an X2-C IP address of "a.b.c.d" and an X2-U IP address of "s.t.u.v". The network 700 also includes a second cell site 103L including a CSR 106L with an eNodeB 106L also having two different X2 IP addresses 704—an X2-C IP address of "e.f.g.h", and an X2-U IP address of "w.x.y.z". Each of the eNodeBs 104K-104L participates in an inter-base station X2 connection 710 with the other eNodeB.

In an embodiment of the invention, the advertisement and installation of routing information for automatically discovered X2 IP addresses occurs utilizing unique RT values generated using a transformation algorithm. A transformation algorithm is a procedure defining how to generate a "unique" RT value based upon an IP address such that the resulting RT value will not be, or is highly unlikely to be, generated by an application of the transformation algorithm to any different IP address. In various embodiments, the shared transformation algorithm can include using the IP address itself as the unique RT value, removing or replacing certain portions of the IP address, appending or prepending values to the IP address, applying a hash/checksum function to the IP address, performing one or more bitwise operations to the IP address (e.g., perform a circular shift of the IP address, perform an exclusive OR (XOR) of the IP address with a defined pattern), or use some other deterministic algorithm with some or all of the IP address as the input.

Thus, according to some embodiments, when a local CSR (e.g., CSR 106K) learns of an X2 IP address utilized by a local eNodeB (e.g., eNodeB 104K), the local CSR 106K applies the shared transformation algorithm to the learned X2 IP address to generate a unique RT value. Then, the local CSR 106K advertises route information for that X2 IP address and tags this route information with the generated unique RT value. In an embodiment, the local CSR 106K advertises a /32 VPNv4 route for the learned X2 IP address, using MP-BGP, which is tagged with the unique RT value. Accordingly, in these embodiments, a unique VPNv4 route is created for every X2 IP address in an area implementing these X2 SON solutions.

The local CSR 106K may learn of the local X2 IP address either through an automatic discovery based upon snooping of traffic (e.g., SCTP INIT ACK messages, HANDOVER REQUEST ACK messages) or by receipt of an explicit connection-oriented message from the local eNodeB (e.g., a CONNECT message including a set of "own" X2 IP addresses).

At the remote cell site (e.g., 130L), upon the remote CSR 106L automatically discovering the "remote" X2 IP address (e.g., one of addresses 702), the remote CSR 106L similarly applies the transformation algorithm to the discovered X2 IP address to generate a same unique RT value. Then, the remote CSR 106L adds the unique RT value to its local import RT list (e.g., 502), which will enable it to install the route advertised by the CSR 106K because the unique RT value of the advertised route matches the unique RT value of the CSR's 106K local import RT list.

By way of example, when the first CSR 106K discovers a local X2 IP address (e.g., the X2-C IP address of "a.b.c.d" 702) of a local eNodeB 104K, it will apply the transformation algorithm to the address "a.b.c.d". Supposing that the transformation algorithm includes prepending a string of "X2_" to the IP address, the generated unique RT value will be "X2_a.b.c.d". When the first CSR 106K advertises this IP address reachability using the routing procotol, the unique RT value will be tagged to that route information. Then, when the second CSR 106L automatically discovers that its local eNodeB 104L has or is beginning an X2 connection 710 with the other eNodeB 104K, it will automatically learn the remote X2 IP address (i.e., "a.b.c.d"), and apply the same transformation algorithm to yield the unique RT value of "X2_a.b.c.d". The second CSR 106L will insert the unique RT value into its import RT list, and upon receiving a routing protocol update message (from a route reflector or another router) including a route tagged with the unique RT value, it will install that route in its VRF table.

In some embodiments of the invention where the BGP RT Constrained Route distribution feature is supported, a CSR may transmit an ORF request (including the generated unique RT value of interest) to a route reflector, allowing the route reflector to perform selective distribution of routes based on RT filtering. Accordingly, those CSRs that do not require a short path route for a given X2 session will be relieved from the burden of needing to filter BGP UPDATE messages based upon their respective import RT lists.

Figure 8:
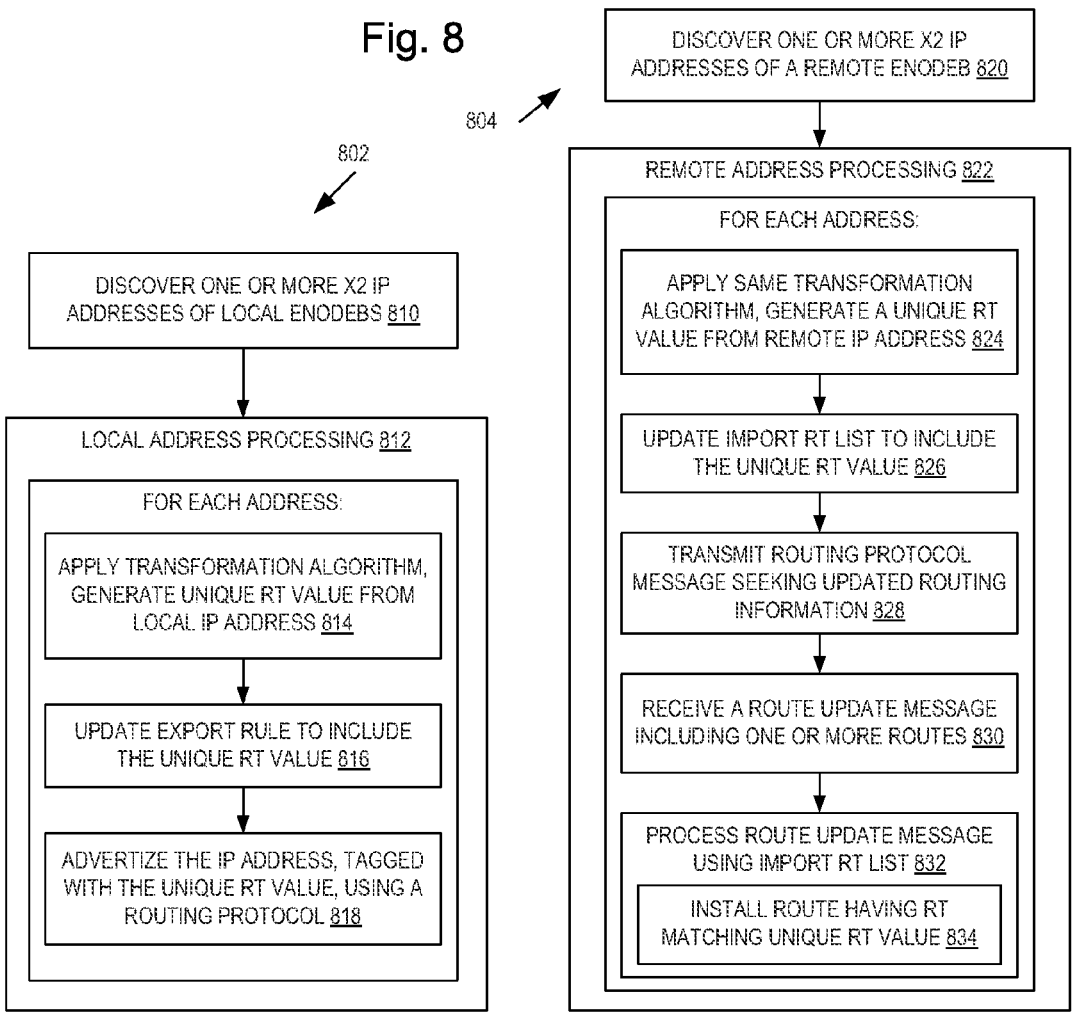
FIG. 8 illustrates procedures for enabling automatic VRF route creation using unique route target values according to an embodiment of the invention.

FIG. 8 illustrates procedures (802, 804) for enabling automatic VRF route creation using unique route target values according to an embodiment of the invention. FIG. 8 includes a procedure 802 for local address processing 812 performed by a CSR for X2 IP addresses of local eNodeBs, and a procedure 804 for remote address processing 822 performed by a CSR for automatically discovered X2 IP addresses of remote eNodeBs having an X2 relation with a local eNodeB.

Upon discovering 810 one or more X2 IP addresses of one or more local eNodeBs, the CSR, in an embodiment, performs local address processing 812. For each discovered local X2 IP address, the CSR will apply 814 the transformation algorithm to the X2 IP address to generate a unique RT value. Next, the CSR will update 816 its export rule—that controls what routing information will be advertised using the routing protocol—to include the generated unique RT value. Accordingly, the CSR will then advertise 816 a route for the X2 IP address (e.g., a /32 VPNv4 route) using the routing protocol. This procedure 802 allows other routers to identify and install the advertised route as pertaining to the X2 IP address of the eNodeB.

At some point, the CSR, upon discovering GW20 one or more X2 IP addresses of one or more remote eNodeBs that one or more local eNodeBs are having or forming X2 relations with, the CSR performs remote address processing 822. For each such automatically discovered remote X2 IP address, the CSR will apply 824 the same transformation algorithm to the X2 IP address to generate the unique RT value. The CSR then updates 826 its import route target list to include the generated unique RT value. Then, the CSR transmits 828 a routing protocol message (e.g., a BGP route refresh message) instructing another router or route reflector to retransmit routing information. Upon receipt 830 of a route update message including one or more routes (sent in response to the transmitted 828 routing protocol message), the CSR will process 832 the route update message using its import RT list. When one of the one or more routes from the route update message includes a route tagged with the unique RT value, the CSR then installs 834 that route into its VRF table.

In embodiments using the described unique route target values, additional routes are advertised in the network (e.g., one additional route for each X2 host) and similarly additional RT values are utilized in the network (e.g., one additional RT value for each X2 host). This increase of routes and RT values provides OAM benefits to these networks as the visibility of additional routes allows for easier and more precise troubleshooting. Further, the transport network is offered additional visibility into the architecture of the RAN. For example, the X2 host routes may be advertised using the routing protocol (e.g., BGP) throughout the RAN as well as the transport network, and thus a complete map of the topology of the RAN is made available to the transport network. Accordingly, the transport network, upon detecting an issue associated with a unique RT (e.g., an alarm being raised on the unique RT), the RAN is able to determine which eNodeB and which X2 interface is affected by (or the cause of) the issue.

Figure 9:
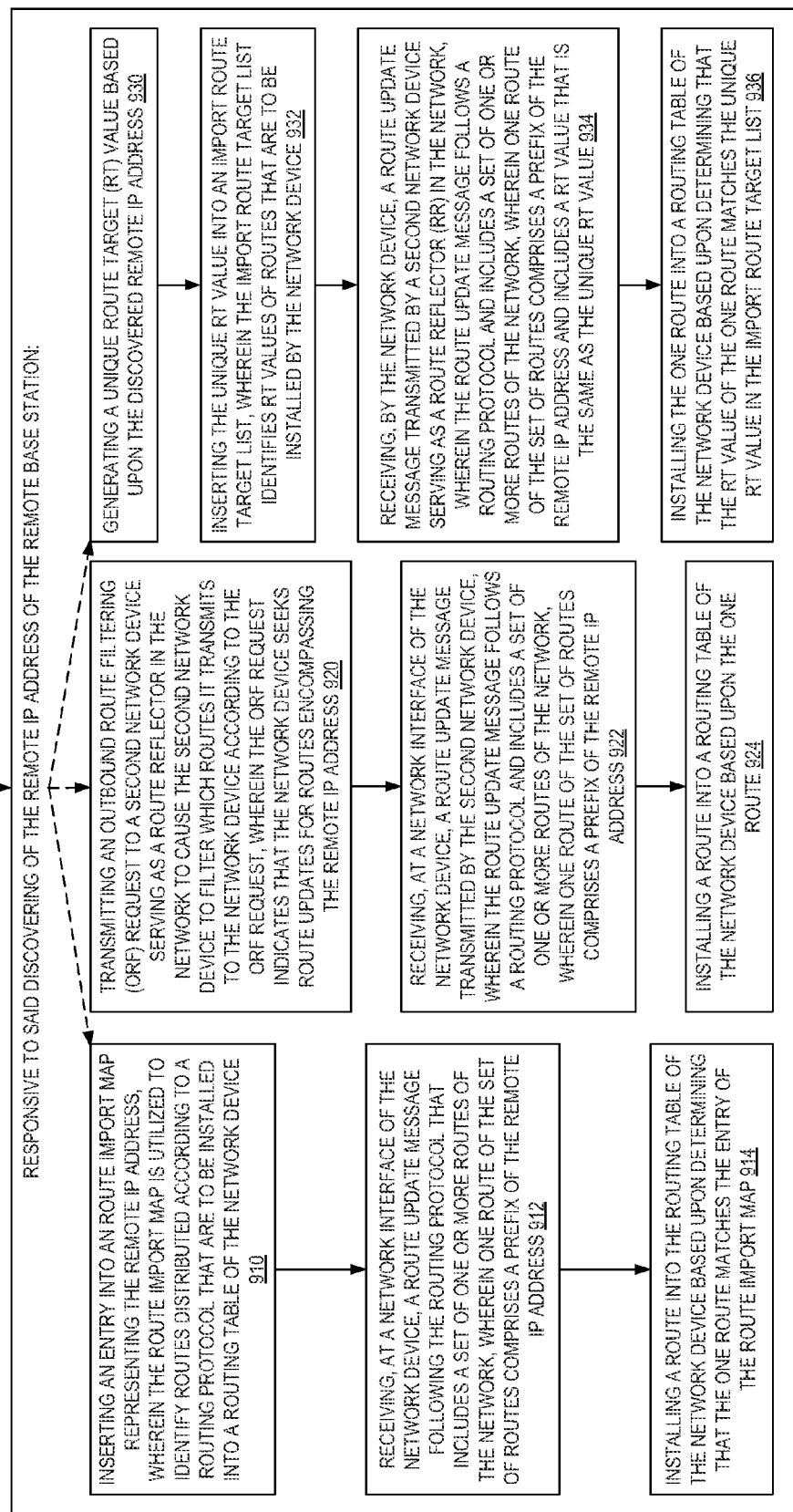
FIG. 9 illustrates flows for enabling automatic VRF route creation of automatically discovered X2 IP addresses according to embodiments of the invention.

FIG. 9 illustrates flows 900 for enabling automatic VRF route creation of automatically discovered X2 IP addresses at a network device according to embodiments of the invention. In some embodiments, one or more of the flows 900 are performed by one or more CSRs 106A-106N in an LTE network 100.

The flows 900 begin with, by the network device, automatically discovering 902 a remote IP address of a remote base station, which is utilized for inter-base station traffic, based upon traffic transmitted by a local base station destined to the network device, or based upon traffic transmitted between the local base station and the remote base station. This traffic may include, depending upon the embodiment, SCTP INIT ACK messages sent between the base stations, HANDOVER REQUEST ACK messages sent between the base stations, or messages sent by the local base station to the network device including one or more remote IP addresses of the remote base station and optionally one or more local IP addresses of the local base station.

Depending upon the embodiment of the invention or configuration of the network, the flows 900 continue with one of three paths.

In a first path, the network device at block 910 inserts an entry into a route import map representing the remote IP address. The route import map is utilized by the network device to identify routes distributed according to a routing protocol that are to be installed into a routing table of the network device. In certain embodiments, the entries of the route import map include IP addresses or IP address prefixes. In an embodiment, the routing protocol is BGP, and the routes are distributed utilizing BGP UPDATE messages. In an embodiment, the routing table of the network device comprises a RIB.

At block 912, the network device receives, at a network interface, a route update message following the routing protocol that includes a set of one or more routes of the network, wherein one route of the set of routes comprises a prefix of the remote IP address. In an embodiment the route update message is a BGP UPDATE message.

At block 914, the network device installs a route into its routing table based upon determining that the one route matches the entry of the route import map. In an embodiment, the one route is determined to match the entry of the route import map if the prefix of the one route exactly matches a prefix of the remote IP address in the route import map. In another embodiment, the one route is determined to match the entry of the route import map if the prefix of the one route indicates a subnet (i.e., a range of IP addresses) that the remote IP address in the route import map is within.

In a second path, the network device at block 920 transmits an ORF request to a second network device serving as a route reflector in the network to cause the second network device to filter which routes it transmits to the network device according to the ORF request. This ORF request indicates that the network device seeks route updates for routes encompassing the remote IP address.

At block 922, the network device receives, at a network interface, a route update message transmitted by the second network device. This route update message follows a routing protocol and includes a set of one or more routes of the network. One route of the set of routes of the route update message comprises a prefix of the remote IP address. In an embodiment, the routing protocol is BGP, and the routes are distributed utilizing BGP UPDATE messages. In an embodiment, the network device does not need to filter the set of routes using an import RT list or a route import map because of the use of the ORF request. At block 924, the network device installs a route into a routing table of the network device based upon the one route.

In a third path, the network device at block 930 generates a unique route target value based upon the discovered remote IP address. In an embodiment, this generation occurs using a transformation algorithm, and in various embodiments the transformation can be a hash (e.g., a Message Digest v5 (MD5) hash, a SHA hash, a cyclic redundancy check (CRC)), a series of bitwise operations, or a concatenation.

At block 932, the network device inserts the generated unique RT value into an import route target list, which identifies RT values of routes that are to be installed by the network device. At block 934, the network device receives a route update message transmitted by a second network device serving as a route reflector in the network. The route update message follows a routing protocol (e.g., BGP) and includes a set of one or more routes of the network. One route of the set of routes comprises a prefix of the remote IP address, and includes a RT value that is the same as the unique RT value in the import route target list. In an embodiment, the RT value of the advertised one route was initially generated by another network device serving as a local CSR for an eNodeB utilizing the remote IP address for X2 communications.

At block 936, the network device installs the one route into a routing table based upon determining that the RT value of the one route matches the unique RT value in the import route target list.

Figure 10:
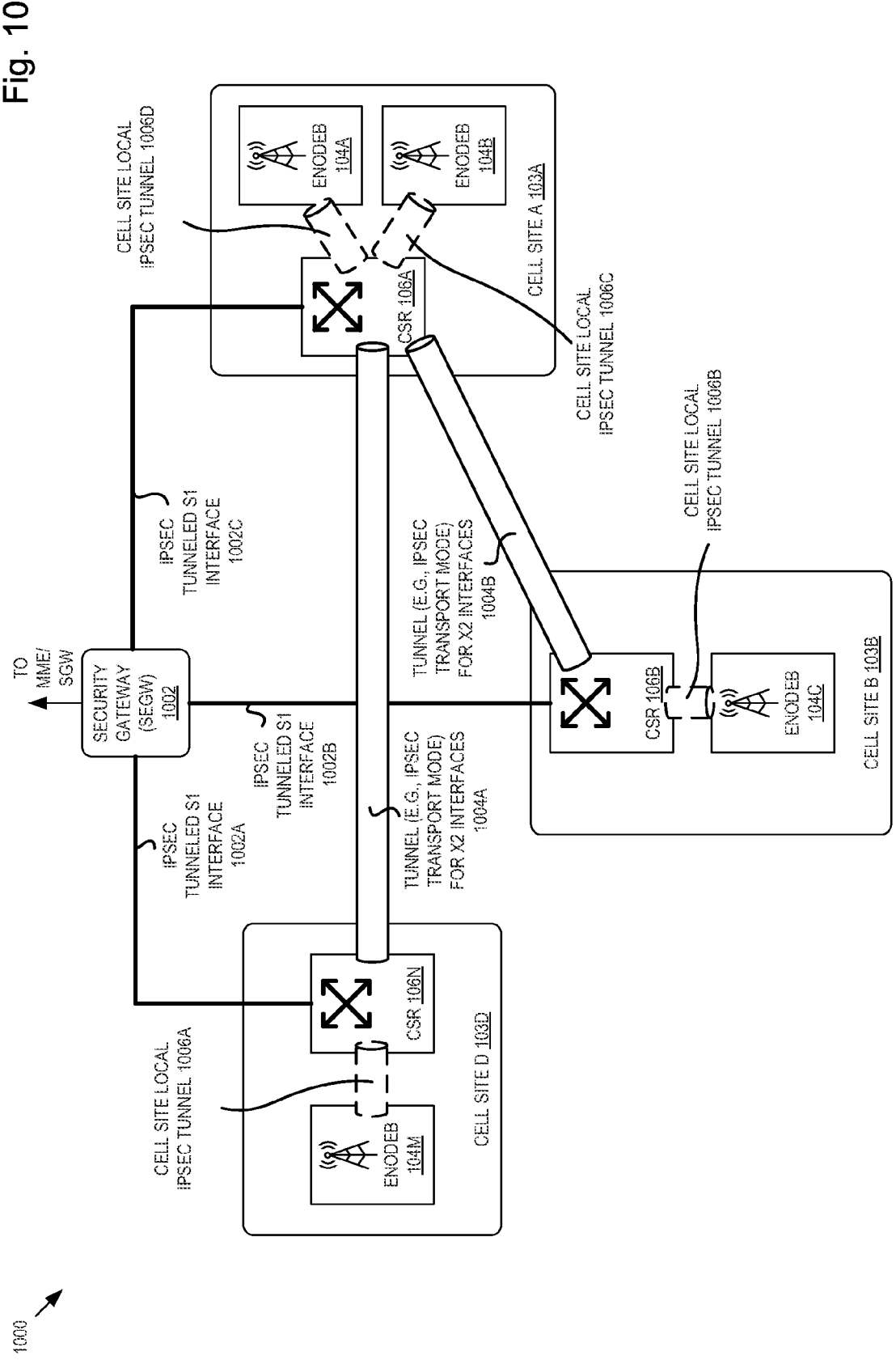
FIG. 10 illustrates an exemplary network utilizing security tunnels between CSRs and also between CSRs and eNodeBs that are automatically generated responsive to the automatic discovery of remote X2 IP addresses according to an embodiment of the invention.

FIG. 10 illustrates an exemplary network 1000 utilizing security tunnels between CSRs and also between CSRs and eNodeBs that are automatically generated responsive to the automatic discovery of remote X2 IP addresses according to an embodiment of the invention. In certain embodiments, subsequent to an automatic discovery of a remote X2 IP address, the network 800 is able to provide not only a self-configuring X2 L3VPN but a self-configuring secured X2 L3VPN by installing VPNv4 routes for the remote X2 IP addresses and also configuring secure transport connections to the necessary neighboring CSRs.

In some embodiments, each CSR (106A, 106B, 106N) utilizes a secure connection (e.g., IPsec tunneled "S1" interfaces 1002A, 1002B, 1002C) back to a Security Gateway (SeGW) 1002 for the purposes of protecting the privacy of S1 traffic, and inter-base station (e.g., X2 traffic) may be routed through the secure S1 interfaces following the long route to the mobile core network 108. However, with the creation of new short paths subsequent to automatic discovery of the remote X2 IP addresses, the inter-base station traffic likely will not be forwarded over these secure connections. Accordingly, embodiments of the invention provide secure X2 SON service with a tunnel 1004A between CSRs (e.g., CSR 106A and CSR 106N) serving the eNodeBs (e.g., eNodeB 104A and eNodeB 104M) involved in X2 communications, and embodiments provide secure X2 SON service between eNodeBs (e.g., eNodeB 104A and eNodeB 104M) using split tunnels including a tunnel 1006D between a first eNodeB 104A and a first CSR 106A, a tunnel 1004A between the first CSR 106A and the second CSR 106N, and another tunnel 1006A between the second CSR 106N and the second eNodeB 104M. In these embodiments, the secure S1 security architecture 1002A-1002C is not affected or modified. Instead, based on the information learned during the topology discovery and VRF creation processes, embodiments of the invention automatically configure IPsec security for new VPNv4 short path routes between CSRs. Some embodiments utilize a split X2 security architecture, whereby X2 traffic is optionally encrypted from local eNodeB 104A to CSR 106A, then encrypted from local CSR 106A to remote CSR 106N, and then again optionally from remote CSR 106N to remote eNodeB 104M.

In an embodiment, to apply encryption, VPN MPLS packets are encapsulated using standards based MPLS-in-IP, or MPLS-in-GRE encapsulation. Once encapsulated, the IP/GRE packet would then be encrypted using IPsec transport mode. The user payload is encrypted in full, including client side source and destination IP addresses, so in this respect it is as secure as tunnel mode. In an embodiment, the resulting encrypted packet then has one or more MPLS transport label(s) added for the X2 short path route, or in some embodiments the packet can simply be routed based on the new IP/GRE header. Accordingly, the VPN traffic may thusly traverse non-MPLS networks, if required, which is especially beneficial for networks configured to use an IP routed service for small cells.

In FIG. 10, assuming S1 tunnels 802A-1002C have already been configured and inter-eNodeB X2 traffic is already passing through these tunnels, this figure presents a migration path. In this case the eNodeBs 104A-104M would be reconfigured to not pass X2 traffic through the existing S1 tunnels 1002A-1002C but rather pass this traffic clear to the respective local CSR 106A-106N or pass the traffic from all of its X2 interfaces through a new single IPsec tunnel (1006A-1006D) to the respective local CSR 106A-106N. Since X2 traffic utilizes a destination IP address of a neighboring eNodeB, and the S1 traffic has a destination IP address of an S-GW in the mobile core network 108, it is possible for the eNodeBs to direct S1 and X2 traffic differently.

Where there are multiple eNodeBs 104A-104B locally supported by the CSR 106A at a site 103A, it is very likely that all such eNodeBs 104A-104B would need X2 connectivity to a given neighboring site 103B. Thus, embodiments of the invention automatically configuring an inter-site tunnel 1004B thus enable it to act as an IPsec aggregator, thereby reducing the number of IPsec tunnels that need to be created. In addition to securing inter-cell site X2 traffic (using tunnel 1004B), embodiments of the invention also secure X2 traffic within a same cell site 103A using eNodeB-to-CSR tunnels 1006C-1006D.

To implement these tunnels, the combined X2 L3VPN route and security SON function aspect of the invention leads a CSR 106A, upon discovering a remote X2 IP address of a remote eNodeB 104C, to install VPNv4 routes for the remote X2 IP addresses, and then additionally set up a secure transport mode IPsec connection 1004B to the neighboring CSR 106B serving the remote eNodeB 104C of interest. Of note is that this secure transport mode IPsec connection 1004B is not formed between the CSR 106A and the remote eNodeB 104C itself, but rather between two CSRs 106A-106B. To enable this configuration, the configuring CSR 106A may determine the remote CSR's 106B network address from the newly-created short route (e.g., VPNv4 route) just installed for the X2 traffic by identifying and using the next hop address from that route, which is the remote CSR's 106B /32 loopback address, as the remote IP address (i.e., endpoint) of the tunnel.

Figure 11:
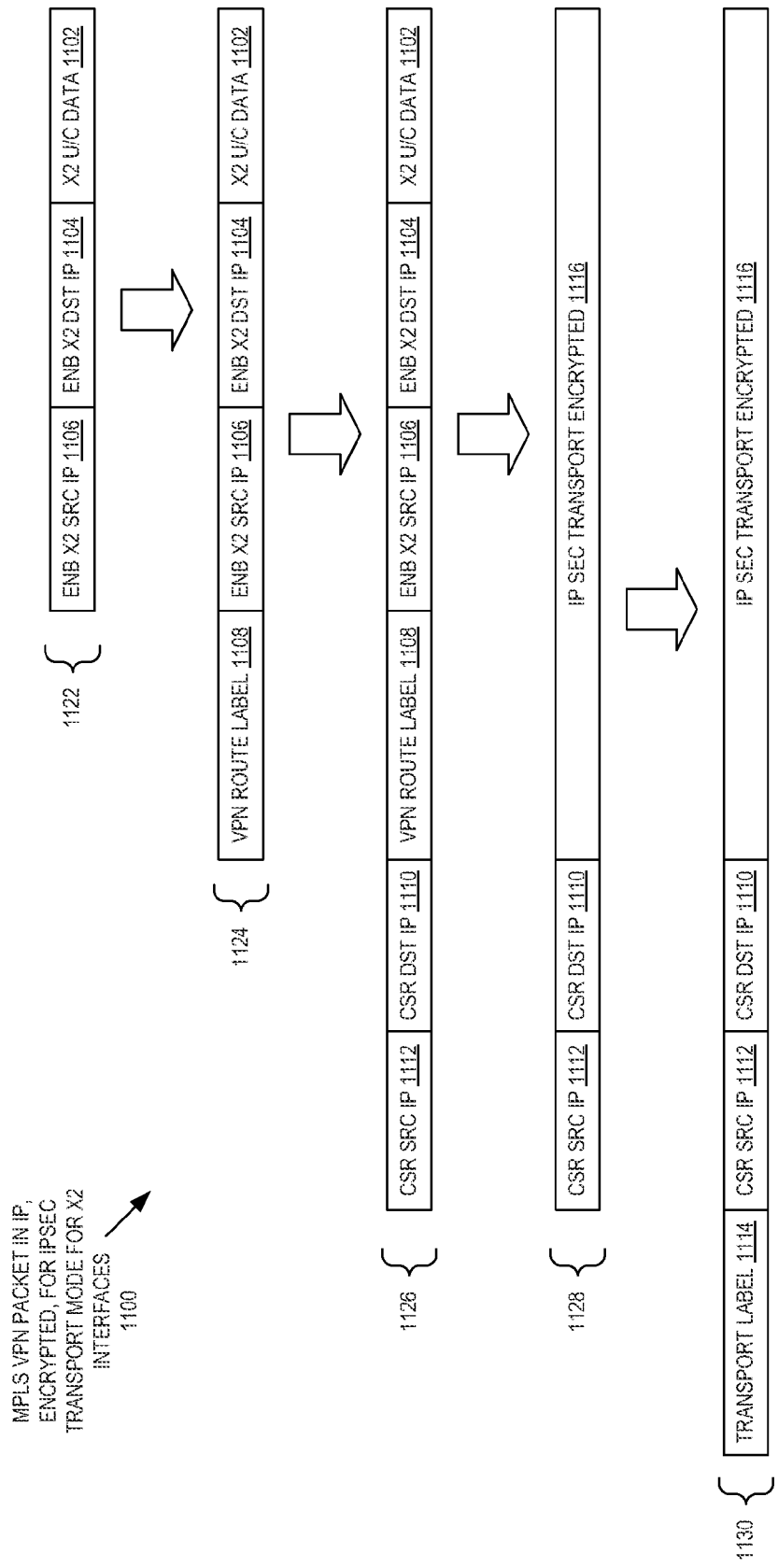
FIG. 11 illustrates the encapsulation and encryption of data for transport using the security tunnels of FIG. 10 according to an embodiment of the invention.

Once the inter-CSR tunnels have been configured, when a CSR (e.g., 106A) receives an X2 packet from a local eNodeB (e.g., 104A), the X2 packet is processed as described in FIG. 11. FIG. 11 illustrates the encapsulation and encryption of data for transport using the security tunnels of FIG. 10 according to an embodiment of the invention. In the illustrated embodiment, an X2 packet is processed to become an MPLS VPN packet in IP, encrypted, for IPsec transport mode. First, the X2 packet 1122, which includes X2 data 1102, an X2 source IP address 1106, and a destination X2 IP address 1104, is received by the CSR. Next, the CSR looks up a route for the X2 packet 1122 in its VRF table to determine an MPLS VPN route label 1108 for the packet, and prepends it to the X2 packet 1122. Next, the MPLS VPN packet 1124 is encapsulated in IP (or, GRE) and the CSR source IP 1112 and the CSR destination IP 1110 addresses are prepended. The IPsec local Security Association (SA) address would the local CSR's /32 loopback address, and the remote SA address would be the newly created VPNv4 route's next hop address, i.e., the remote CSR's /32 loopback address. The remote CSR's /32 loopback address is determined using the same information gathered by the SON topology discovery and route creation processes described above. Then, the MPLS portion of this packet 1126 is encrypted 1116 using IPsec transport mode, although in some embodiments that portion 1126 is encrypted earlier than the addition of the CSR source IP 1112 and CSR destination IP 1110. Finally, an MPLS transport label 1114 is added, and the entire packet 1130 is ready to be transmitted.

Figure 12:
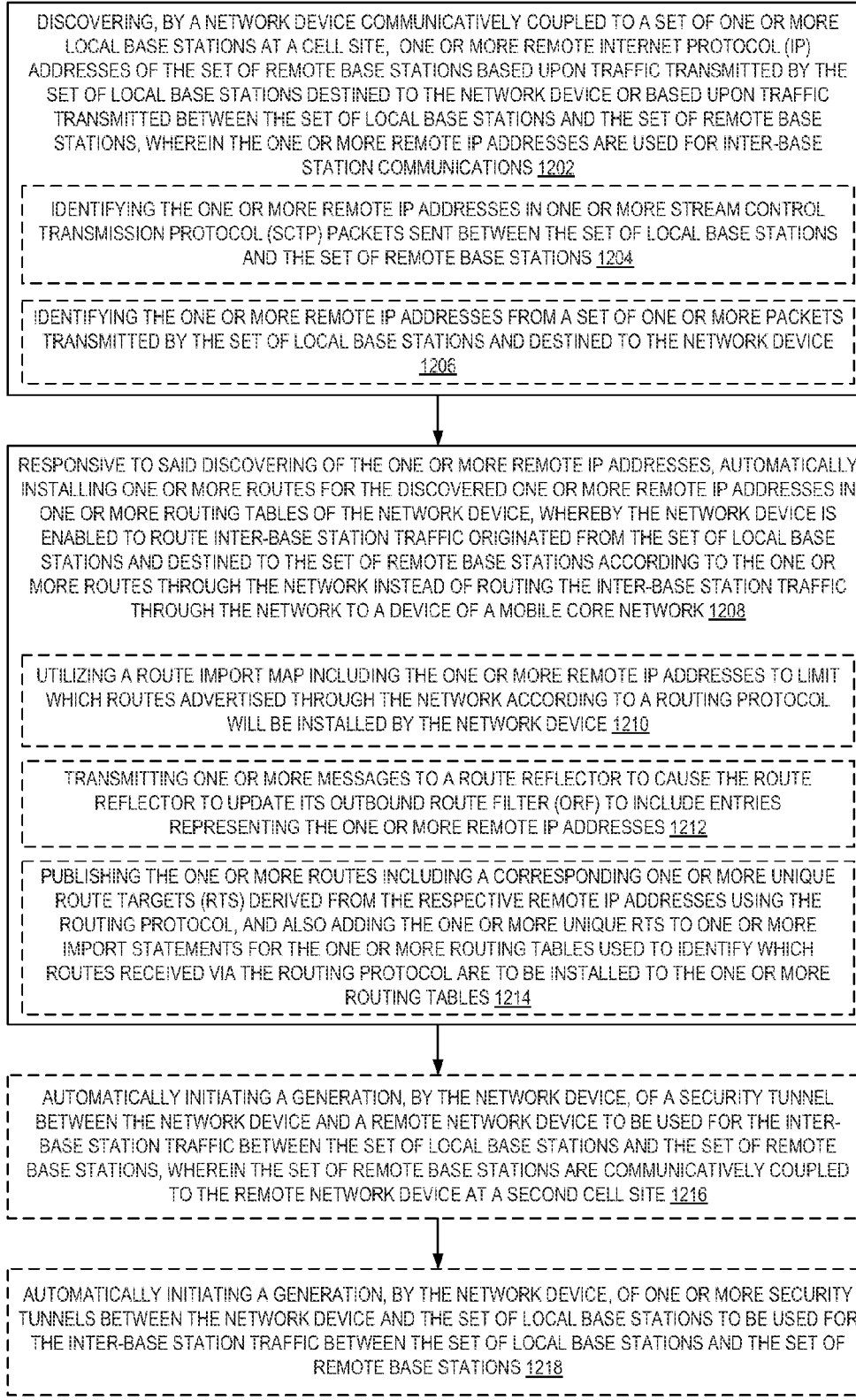
FIG. 12 illustrates a flow for the discovery of remote X2 addresses and subsequent automatic VRF route creation according to an embodiment of the invention.

FIG. 12 illustrates a flow 1200 for the discovery of remote X2 addresses and subsequent automatic VRF route creation according to an embodiment of the invention. The flow 1200 includes, at 1202, discovering, by a network device (e.g., CSR) communicatively coupled to a set of one or more local base stations (e.g., eNodeBs) at a cell site, one or more remote IP addresses (e.g., X2 IP addresses) of the set of remote base stations based upon traffic transmitted by the set of local base stations destined to the network device (e.g., CONNECT messages) or based upon traffic transmitted between the set of local base stations and the set of remote base stations (e.g., SCTP INIT ACK messages, HANDOVER REQUEST ACK messages), wherein the one or more remote IP addresses are used for inter-base station communications (e.g., X2 traffic). In an embodiment, the discovering 1202 includes identifying 1204 the one or more remote IP addresses in one or more Stream Control Transmission Protocol (SCTP) packets sent between the set of local base stations and the set of remote base stations. In an embodiment, the discovering 1202 includes identifying 1206 the one or more remote IP addresses from a set of one or more packets transmitted by the set of local base stations and destined to the network device.

The flow 1200 also includes, responsive to the discovering of the one or more remote IP addresses, automatically installing 1208 one or more routes for the discovered one or more remote IP addresses in one or more routing tables of the network device. Thus, the network device is enabled to route inter-base station traffic originated from the set of local base stations and destined to the set of remote base stations according to the one or more routes through the network, instead of routing the inter-base station traffic through the network to a device of a mobile core network. In an embodiment, the automatic installing 1208 includes utilizing 1210 a route import map including the one or more remote IP addresses to limit which routes advertised through the network according to a routing protocol will be installed by the network device. In an embodiment, the automatic installing 1208 includes transmitting 1212 one or more messages to a route reflector to cause the route reflector to update its Outbound Route Filter (ORF) to include entries representing the one or more remote IP addresses. In an embodiment, the automatic installing 1208 includes publishing 1214 the one or more routes, which include a corresponding one or more unique route targets (RTs) derived from the respective remote IP addresses, using the routing protocol, and also adding the one or more unique RTs to one or more import statements for the one or more routing tables used to identify which routes received via the routing protocol are to be installed to the one or more routing tables.

In some embodiments, the flow 1200 also includes automatically initiating a generation 1216, by the network device, of a security tunnel between the network device and a remote network device to be used for the inter-base station traffic between the set of local base stations and the set of remote base stations. The set of remote base stations are communicatively coupled to the remote network device at a second cell site.

In some embodiments, the flow 1200 also includes automatically initiating a generation 1218, by the network device, of one or more security tunnels between the network device and the set of local base stations to be used for the inter-base station traffic between the set of local base stations and the set of remote base stations.

Figure 13:
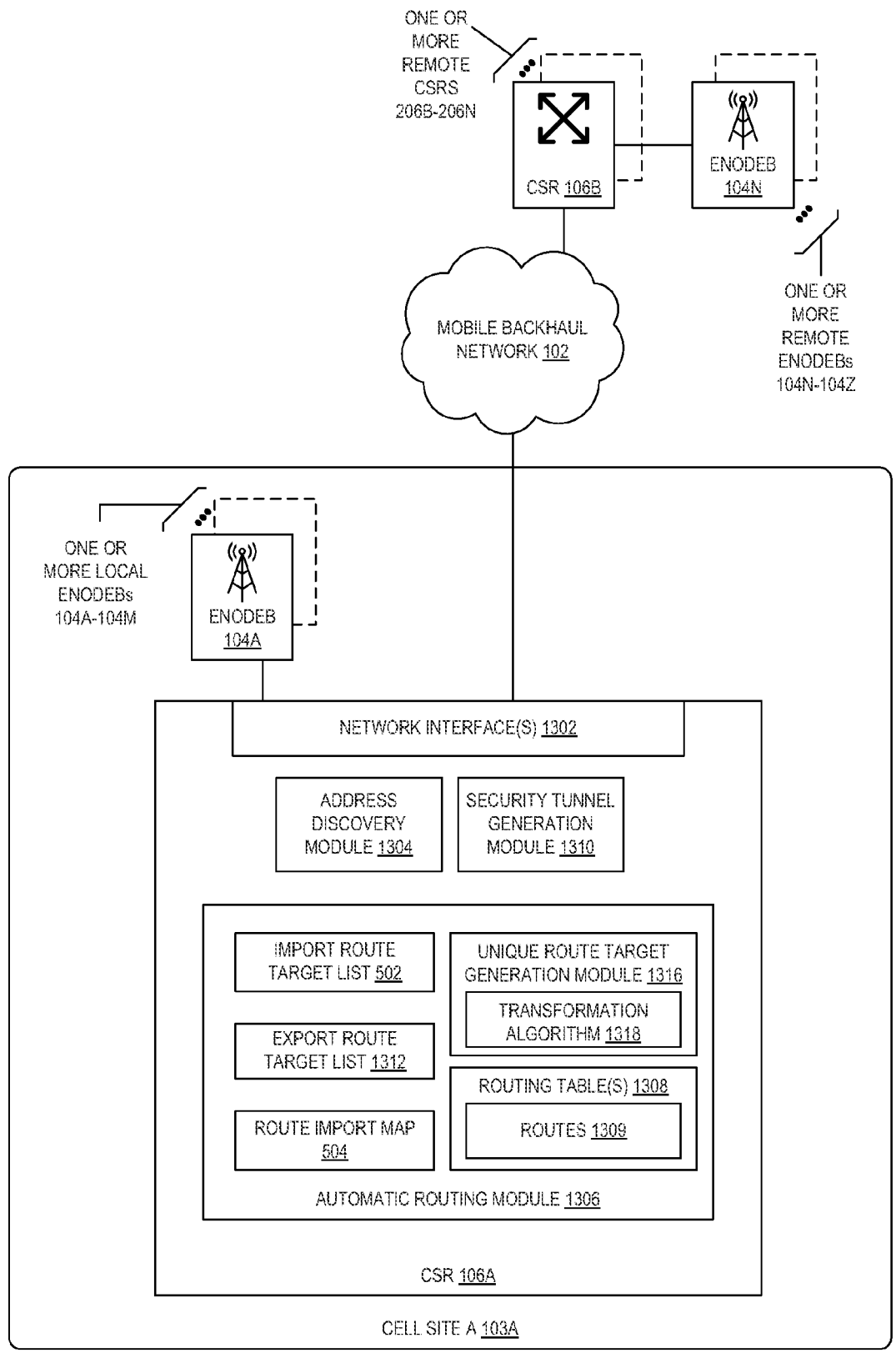
FIG. 13 illustrates components of a cell site router allowing for automatic X2 topology discovery and VRF route creation according to an embodiment of the invention.

FIG. 13 illustrates components of a cell site router 106A allowing for automatic X2 topology discovery and VRF route creation according to an embodiment of the invention. This CSR 106A is depicted as including only a few elements to aid in the ease of understanding of the invention; other well-known elements (e.g., processors, buses, memories) are not depicted herein to avoid obscuring the invention. The CSR 106A, which is located at a cell site 103A and communicatively coupled with a set of one or more local eNodeBs 104A-104M at the cell site 103A, is communicatively coupled with a mobile backhaul network 102 using one or more physical network interfaces 1302. Through the mobile backhaul network 102, the CSR 106A is operable to communicate with one or more remote CSRs 206B-206N connected to one or more remote eNodeBs 104N-104Z at one or more remote cell sites.

An address discovery module 1304 of the CSR 106A is to be coupled to the set of network interfaces 1302 and configured to discover, based upon traffic transmitted by the set of local eNodeBs 104A-104M destined to the CSR 106A or based upon traffic transmitted between the set of local eNodeBs 104A-104M and the set of remote eNodeBs 104N-104Z, one or more remote X2 IP addresses of the set of remote eNodeBs 104N-104Z.

The CSR 106A also includes an automatic routing module 1306, which includes one or more routing tables 1308 (e.g., VRFs) that include one or more routes 1309. The depicted CSR 106A includes an import RT list 502, which comprises a list of zero or more route target values that indicate which advertised routes should be installed by the CSR 106A into its routing tables 1308, as described earlier herein. The depicted CSR 106A also includes an export RT list 1312, which includes a list of zero or more route target values that are to be attached to routes advertised, using the routing protocol, by the CSR 106A. The depicted CSR 106A also includes a route import map 504, which includes a list of zero or more route prefixes of interest to match against advertised routes to determine which routes are to be installed into the routing table 1308. The automatic routing module 1306, in an embodiment, is configured to, responsive to the address discovery module 1304 discovering remote IP addresses, automatically install one or more routes for the IP addresses in one or more routing tables 1308, whereby the CSR 106A is thusly enabled to route X2 traffic originated from the set of local eNodeBs 104A-104M and destined to the set of remote eNodeBs 104N-104Z according to the one or more routes 1309 that provide a shorter path to the set of remote eNodeBs 104N-104Z through the backhaul network 102 instead of routing the X2 traffic through a mobile core network (not illustrated).

The depicted CSR 106A also includes a unique route target generation module 1316, which as described above, is configured to generate unique RT values from an IP address through an application of a transformation algorithm 1318.

The CSR 106A also includes a security tunnel generation module 1310, which, after the address discovery module 1304 automatically discovers remote X2 IP addresses of the one or more remote eNodeBs 104N-104Z that are part of X2 relations with the set of local eNodeBs 104A-104M, automatically configures one or more security tunnels between the CSR 106A and respective remote CSRs 206B-206N, and optionally also between the CSR 106A and the respective local eNodeBs 104A-104M.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.). Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network device communicatively coupled to a local base station at a cell site for automatic creation of a more optimal route entry in the network device for inter-base station traffic to be transmitted between the local base station and a remote base station through a backhaul network, the method comprising:
    discovering, by the network device, a remote Internet Protocol (IP) address of the remote base station within traffic transmitted by the local base station destined to the network device or within traffic transmitted between the local base station and the remote base station, wherein the remote IP address is utilized for the inter-base station traffic between the local base station and the remote base station;
    responsive to said discovering of the remote IP address of the remote base station, inserting, by the network device, an entry into a route import map representing the remote IP address, wherein the route import map is utilized by the network device to identify routes distributed according to a routing protocol that are to be installed into a routing table of the network device;
    receiving, at a network interface of the network device, a route update message following the routing protocol that includes a set of one or more routes of the network, wherein one route of the set of routes comprises a prefix of the remote IP address, and wherein the one route is the more optimal route as it provides a shorter path to the remote base station through the backhaul network compared to a less optimal route through a mobile core network previously used for the inter-base station traffic;
    installing, by the network device, a route entry into the routing table of the network device based upon determining that the one route matches the entry of the route import map;
    receiving, at the network device, one or more packets from the local base station that are destined to the remote base station; and
    transmitting, by the network device based upon the route entry, the one or more packets toward the remote base station over the more optimal route instead of over the less optimal route through the mobile core network.

2. The method of claim 1, wherein the installed route entry identifies only one IP address, wherein the one IP address is the remote IP address.

3. The method of claim 1, wherein the installed route entry identifies a plurality of IP addresses in a range of IP addresses, wherein the remote IP address is within the range of IP addresses.

4. The method of claim 1, wherein said installing the route entry is further based upon the one route including a route target value matching an import route target value defined at the network device.

5. A network device to be communicatively coupled to a set of one or more local base stations at a cell site and configured to automatically create more optimal route entries in the network device for inter-base station traffic to be transmitted between the set of local base stations and a set of one or more remote base stations through a backhaul network, the network device comprising:
    a set of one or more network interfaces;
    one or more processors; and one or more non-transitory computer-readable storage media having instructions which, when executed by the one or more processors, cause the network device to:

discover, within traffic transmitted by the set of local base stations destined to the network device or within traffic transmitted between the set of local base stations and the set of remote base stations, remote Internet Protocol (IP) addresses of the set of remote base stations that are used for the inter-base station traffic between the set of local base stations and the set of remote base stations insert, responsive to the discovery of one of the remote IP addresses of the set of remote base stations, an entry into a route import map representing the one remote IP address, wherein the route import map is to be utilized by the network device to identify routes distributed according to a routing protocol that are to be installed into a routing table of the network device, receive, using the set of network interfaces, route update messages following the routing protocol that include routes of the backhaul network, install route entries into the routing table of the network device based upon determining that routes of the received route update messages match entries of the route import map, wherein some of the route entries are more optimal routes providing shorter paths to the set of remote base stations through the backhaul network compared to less optimal routes through a mobile core network previously used for the inter-base station traffic, receiving one or more packets from a local base station of the set of local base stations that are destined to a remote base station of the set of remote base stations, and transmit, based upon the route entry, the one or more packets toward the remote base station over the more optimal route instead of over the less optimal route through the mobile core network.

6. The network device of claim 5, wherein one of the installed route entries is to identify only one IP address, wherein the one IP address is the remote IP address of the route of the received route update message that matches one of the entries of the route import map.

7. The network device of claim 5, wherein one of the installed route entries is to identify a plurality of IP addresses in a range of IP addresses, wherein the remote IP address of the route of the received route update message that matches one of the entries of the route import map is within the range of IP addresses.

8. The network device of claim 5, wherein the route entries are to be installed into the routing table further based upon the routes including route target values matching an import route target value defined at the network device.

9. A method in a network device communicatively coupled to a local base station at a cell site for automatic creation of a more optimal route entry in the network device for inter-base station traffic to be transmitted between the local base station and a remote base station through a backhaul network, the method comprising:

discovering a remote Internet Protocol (IP) address of the remote base station within traffic transmitted by the local base station destined to the network device or within traffic transmitted between the local base station and the remote base station, wherein the remote IP address is utilized for the inter-base station traffic;

responsive to said discovering of the remote IP address of the remote base station, transmitting an outbound route filtering (ORF) request to a second network device serving as a route reflector in the backhaul network to cause the second network device to filter which routes it transmits to the network device according to the ORF request, wherein the ORF request indicates that the network device seeks route updates for routes encompassing the remote IP address;

receiving, at a network interface of the network device, a route update message transmitted by the second network device, wherein the route update message follows a routing protocol and includes a set of one or more routes of the backhaul network, wherein one route of the set of routes comprises a prefix of the remote IP address, and wherein the one route is the more optimal route as it provides a shorter path to the remote base station through the backhaul network compared to a less optimal route through a mobile core network previously used for the inter-base station traffic; and installing a route entry into a routing table of the network device based upon the one route.

10. The method of claim 9, wherein said installing of the route entry is further based upon the one route having a route target value matching a locally defined import route target value.

11. The method of claim 9, further comprising after said transmitting of the ORF request, transmitting a route refresh message following the routing protocol to the second network device to cause the second network device to transmit the route update message.

12. The method of claim 9, wherein the installed route entry identifies only one IP address, wherein the one IP address is the remote IP address.

13. The method of claim 9, wherein the installed route entry identifies a plurality of IP addresses in a range of IP addresses, wherein the remote IP address is within the range of IP addresses.

14. A network device to be communicatively coupled to a set of one or more local base stations at a cell site and configured to automatically create more optimal route entries for inter-base station traffic to be transmitted between the set of local base stations and a set of one or more remote base stations through a backhaul network, the network device comprising:

a set of one or more network interfaces;
one or more processors; and
one or more non-transitory computer-readable storage media having instructions which, when executed by the one or more processors, cause the network device to:

discover, within traffic transmitted by the set of local base stations destined to the network device or within traffic transmitted between the set of local base stations and the set of remote base stations, remote Internet Protocol (IP) addresses of the set of remote base stations that are used for the inter-base station traffic, transmit, using the set of network interfaces in response to discovering the remote IP addresses of the set of remote base stations, outbound route filtering (ORF) requests to a second network device serving as a route reflector in the backhaul network to cause the second network device to filter which routes it transmits to the network device according to the ORF requests, wherein the ORF requests indicate that the network device seeks route updates for routes encompassing the remote IP addresses, receive, using the set of network interfaces, route update messages transmitted by the second network device, wherein the route update messages follow a routing protocol and include sets of one or more routes of the backhaul network, wherein the sets of routes of the backhaul network comprise prefixes of the remote IP addresses, and wherein the sets of routes are more optimal routes as they provide shorter paths to the set of remote base stations through the backhaul network compared to less optimal routes through a mobile core network previously used for the inter-base station traffic, and install route entries into a routing table of the network device based upon the sets of routes received in the route update messages.

15. The network device of claim 14, wherein the route entries are to be installed further based upon the sets of routes having route target values matching locally defined import route target values.

16. The network device of claim 14, wherein the instructions, when executed by the one or more processors, further cause the network device to:

transmit route refresh messages, according to the routing protocol, to the second network device to cause the second network device to transmit the route update messages.

17. The network device of claim 14, wherein at least one of the installed route entries identifies only one IP address, wherein the one IP address is one of the remote IP addresses.

18. The network device of claim 14, at least one of the installed route entries identifies a plurality of IP addresses in a range of IP addresses, wherein at least one of the remote IP addresses is within the range of IP addresses.

* * * * *